US012429109B2

(12) United States Patent
Nagata

(10) Patent No.: US 12,429,109 B2
(45) Date of Patent: Sep. 30, 2025

(54) INSULATOR

(71) Applicant: G CLEF ACOUSTIC LTD., Ikeda (JP)

(72) Inventor: Ryoji Nagata, Ikeda (JP)

(73) Assignee: G CLEF ACOUSTIC LTD., Ikeda (JP)

( * ) Notice: Subject to any disclaimer, the term of this patent is extended or adjusted under 35 U.S.C. 154(b) by 0 days.

(21) Appl. No.: 18/256,217

(22) PCT Filed: Oct. 20, 2021

(86) PCT No.: PCT/JP2021/038801
§ 371 (c)(1),
(2) Date: Jun. 7, 2023

(87) PCT Pub. No.: WO2023/067737
PCT Pub. Date: Apr. 27, 2023

(65) Prior Publication Data
US 2024/0019014 A1    Jan. 18, 2024

(51) Int. Cl.
*F16F 15/00* (2006.01)
*F16F 15/06* (2006.01)

(52) U.S. Cl.
CPC .......... *F16F 15/06* (2013.01); *F16F 2230/40* (2013.01)

(58) Field of Classification Search
None
See application file for complete search history.

(56) References Cited

U.S. PATENT DOCUMENTS

| 3,212,745 | A  | * | 10/1965 | Lode | F16F 15/02 |
|---|---|---|---|---|---|
|  |  |  |  |  | 52/167.6 |
| 2011/0232216 | A1 | * | 9/2011 | Schroeder | E04C 5/12 |
|  |  |  |  |  | 52/223.8 |
| 2014/0048989 | A1 | * | 2/2014 | Platus | F16F 15/04 |
|  |  |  |  |  | 267/140.5 |

(Continued)

FOREIGN PATENT DOCUMENTS

JP    5145310 B2    11/2012
JP    6094785 B1    2/2017

OTHER PUBLICATIONS

International Search Report (PCT/ISA/210) with translation and Written Opinion (PCT/ISA/237) mailed on Nov. 30, 2021, by the Japan Patent Office as the International Searching Authority for International Application No. PCT/JP2021/038801. (8 pages).

*Primary Examiner* — Steven M Marsh
(74) *Attorney, Agent, or Firm* — BUCHANAN, INGERSOLL & ROONEY PC

(57) ABSTRACT

First to Nth plate-shaped members (N: an integer not less than 3) are arranged at multiple stages. The plate-shaped member for a kth number counted from the first plate-shaped member is defined as a kth plate-shaped member (k: integers from 2 to N−1). The first plate-shaped member has a first wire support portion. The kth plate-shaped member has a kth through hole through which a (k−1)th wire support portion of the (k−1)th plate-shaped member penetrates. A (k−1)th wire suspending the kth plate-shaped member is provided at an upper part of the (k−1)th wire support portion penetrating through the kth through hole. A kth wire support portion is provided adjacently to the kth through hole in a predetermined rotational direction around a reference point on the kth plate-shaped member.

20 Claims, 24 Drawing Sheets

(56) References Cited

U.S. PATENT DOCUMENTS

2015/0114762 A1* 4/2015 Olkkonen ............ B66D 5/08
                                                    187/250
2019/0108817 A1  4/2019 Nagata
2025/0060021 A1* 2/2025 Yilmaz ............... F16F 15/04

* cited by examiner

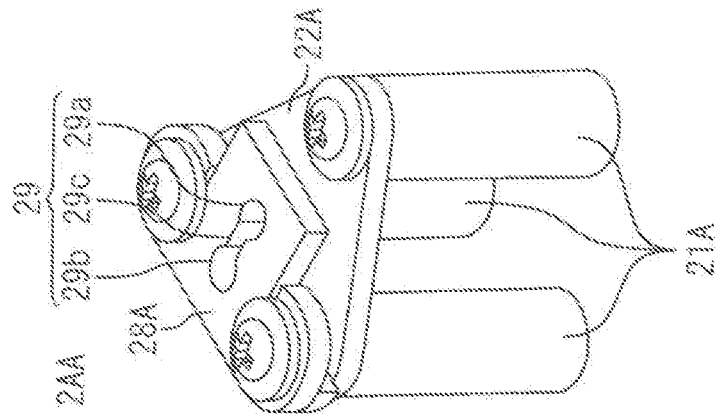
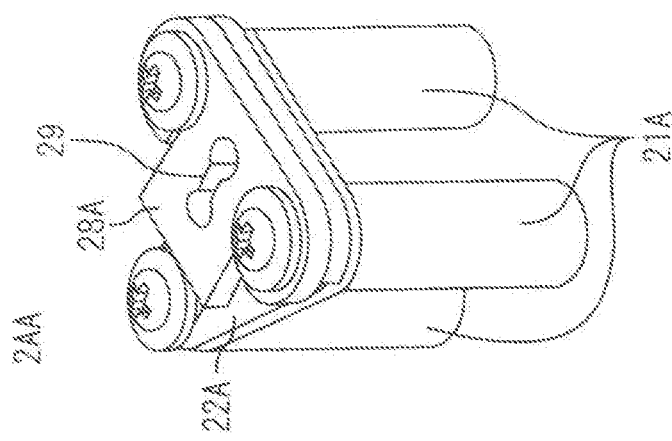
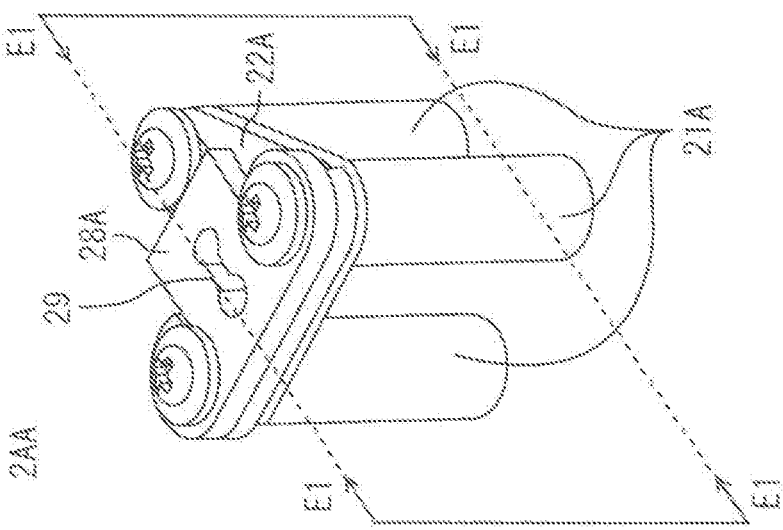

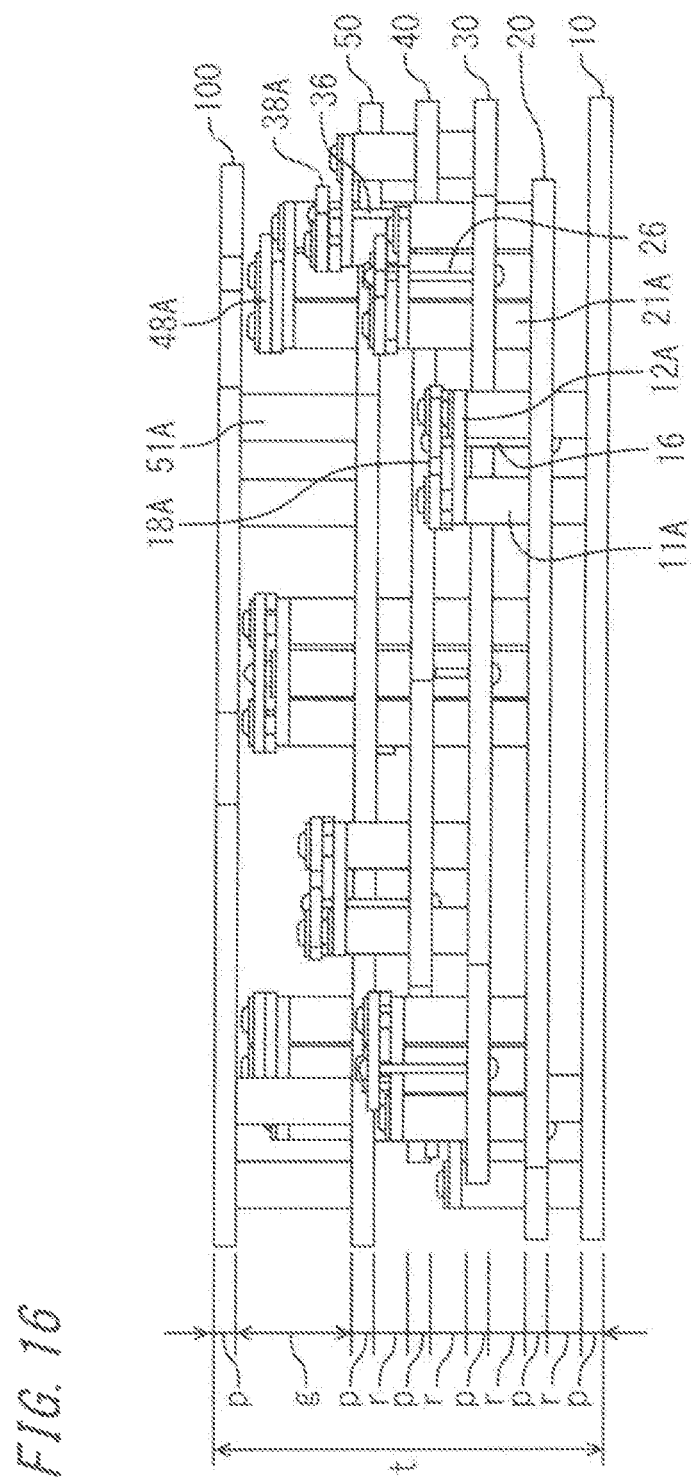

INSULATOR

TECHNICAL FIELD

The present disclosure relates to an insulator for inhibiting vibration transmission between a vibration device and an external surface.

BACKGROUND ART

The present inventor previously developed an insulator to be used in a state interposed between a speaker and a floor surface, for example, and obtained the patent for the insulator (see Patent Document 1 below). This insulator has a structure that allows a speaker or the like to be substantially suspended by a wire, and utilizes free vibration in pendulum motion based on the wire suspension structure. Thus, a state in which the speaker or the like is substantially floated in an acoustic sense can be realized, thereby making it possible to reproduce sound intrinsic to the speaker or the like without being influenced from the floor surface.

In addition, the present inventor developed an insulator which is interposed between a vibration generating object such as a piano and a floor surface and which improves sound of the vibration generating object such as the piano and inhibits vibration to the floor surface, and obtained the patent for the insulator (see Patent Document 2 below).

CITATION LIST

Patent Document

Patent Document 1: Japanese Patent No. 5145310
Patent Document 2: Japanese Patent No. 6094785

SUMMARY OF THE INVENTION

Problems to be Solved by the Invention

The above conventional insulators inhibit vibration transmission between a vibration device and an external surface by utilizing pendulum motion based on a wire suspension structure.

The present disclosure has been made to improve the above conventional insulators, and an object of the present disclosure is to further inhibit vibration transmission between a vibration device and an external surface.

Means to Solve the Problem

An insulator according to the present disclosure is disposed between a vibration device and an external surface and inhibits vibration transmission between the vibration device and the external surface. The insulator includes N plate-shaped members which are first to Nth plate-shaped members and are arranged in this order at multiple stages such that reference points on the respective plate-shaped members are aligned in a vertical direction, N being an integer not less than 3. The plate-shaped member for a kth number counted from the first plate-shaped member is defined as a kth plate-shaped member, k being all integers not less than 2 and not greater than N−1. The first plate-shaped member is provided with a first wire support portion. The kth plate-shaped member is provided with a kth through hole through which a (k−1)th wire support portion provided to the (k−1)th plate-shaped member penetrates, a (k−1)th wire suspending the kth plate-shaped member is provided at an upper part of the (k−1)th wire support portion penetrating through the kth through hole, and a kth wire support portion is provided at a position adjacent to the kth through hole in a predetermined rotational direction around the reference point on the kth plate-shaped member. The Nth plate-shaped member is provided with an Nth through hole through which an (N−1)th wire support portion provided to the (N−1)th plate-shaped member penetrates, an (N−1)th wire suspending the Nth plate-shaped member is provided at an upper part of the (N−1)th wire support portion penetrating through the Nth through hole, and a mounting base for mounting the vibration device thereon is attached to the Nth plate-shaped member. The first wire support portions on the first plate-shaped member and the first wires thereof are arranged at a plurality of locations around the reference point on the first plate-shaped member. The kth wire support portions on the kth plate-shaped member and the kth wires thereof are arranged at a plurality of locations around the reference point on the kth plate-shaped member.

Effect of the Invention

The insulator according to the present disclosure can further inhibit vibration transmission between a vibration device and an external surface.

BRIEF DESCRIPTION OF THE DRAWINGS

FIG. 12A, FIG. 12B, and FIG. 12C are perspective views of a wire support portion of the insulator of embodiment 3, as seen in three different directions.

FIG. 16 is a side view of the insulator according to embodiment 3.

DESCRIPTION OF EMBODIMENTS

Figure 1:
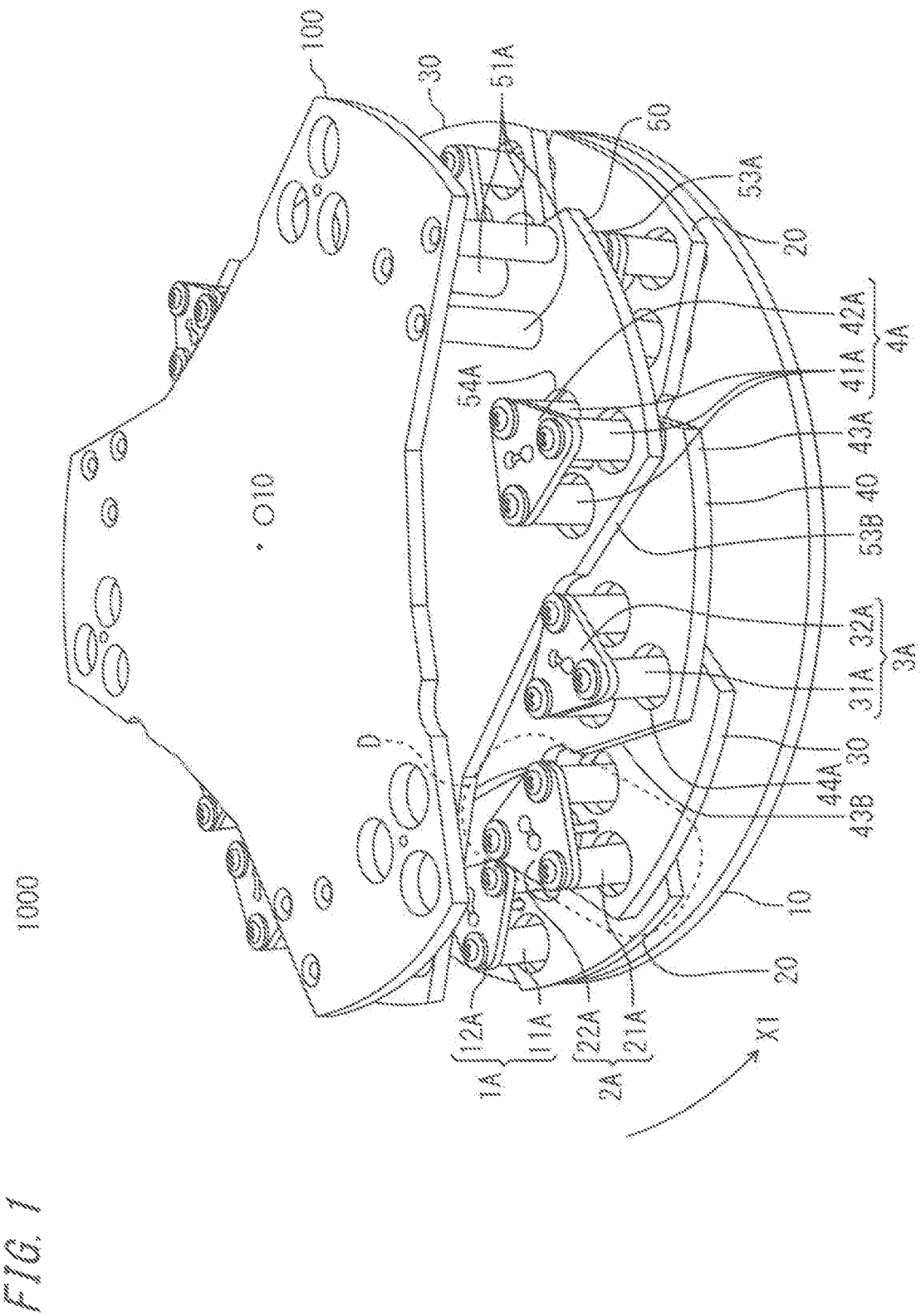
FIG. 1 is a perspective view showing the entire structure of an insulator according to embodiment 1.

The present disclosure relates to an insulator which is disposed between a vibration device and an external surface and inhibits vibration transmission between the vibration device and the external surface.

The insulator of the present disclosure includes N plate-shaped members which are first to Nth plate-shaped members (N is an integer not less than 3) and are arranged at multiple stages, and between the respective plate-shaped members, wires attached to wire support portions of the plate-shaped member located at a lower stage suspend the plate-shaped member located at an upper stage, thus having a so-called multistage suspension structure, whereby vibration generated by the vibration device is inhibited from being directly transmitted to the external surface and vibration from the external surface is inhibited from being directly transmitted to the vibration device.

Examples of the vibration device include: an acoustic device such as a speaker, a compact disc (CD) player, a laser disc (LD) player, a record player, or a power amplifier; a computer device such as a hard disk or a calculator; and a precision device such as an electronic microscope.

Hereinafter, embodiments of the present disclosure will be described with reference to the drawings. In the drawings, the same or corresponding parts are denoted by the same reference characters, and the description thereof is omitted or simplified as appropriate. Regarding the parts shown in the drawings, shapes, sizes, arrangements, and the like may be changed as appropriate within the scope of the present disclosure.

Embodiment 1

Figure 2:
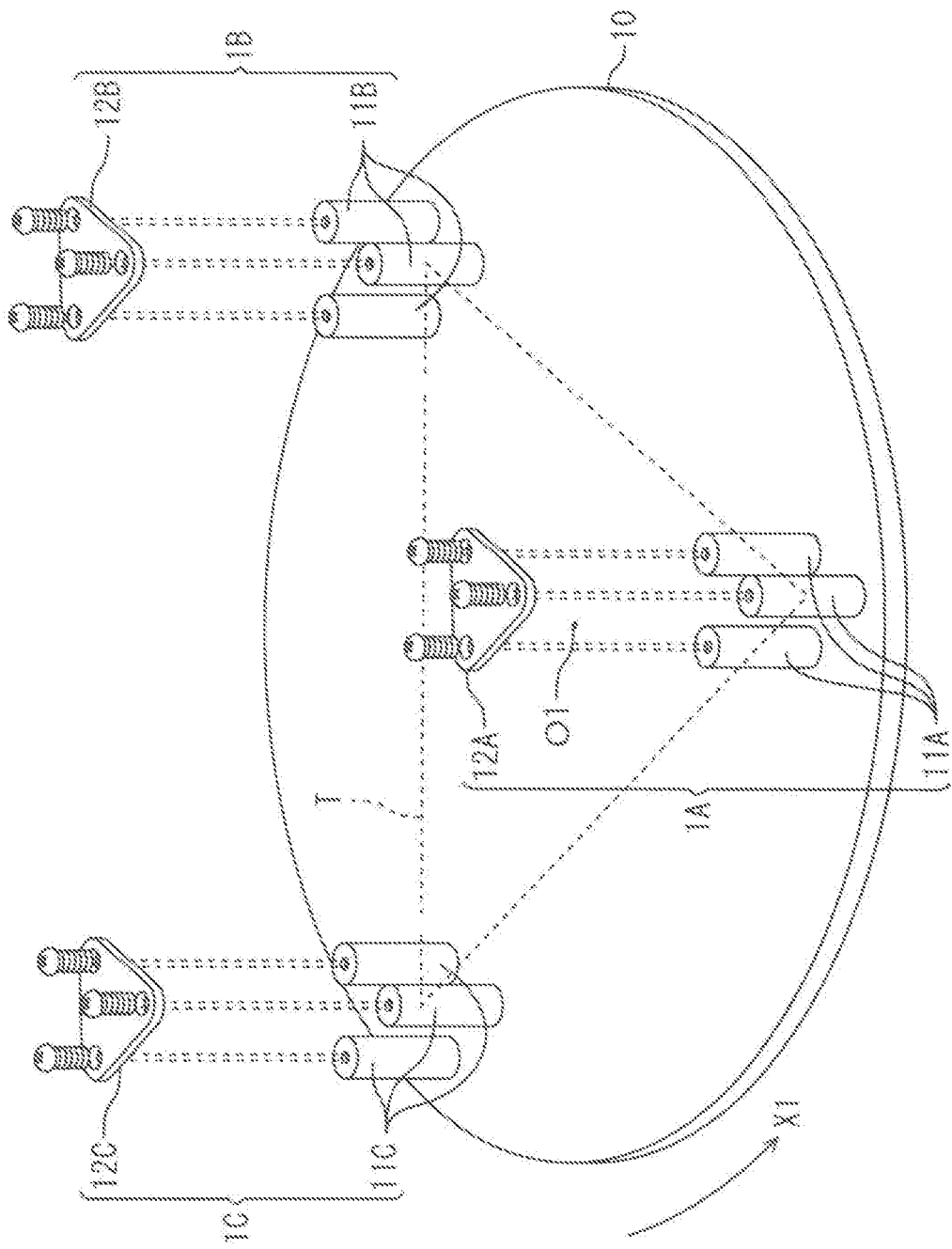
FIG. 2 is a perspective view showing an assembly process for the insulator according to embodiment 1.
Figure 3:
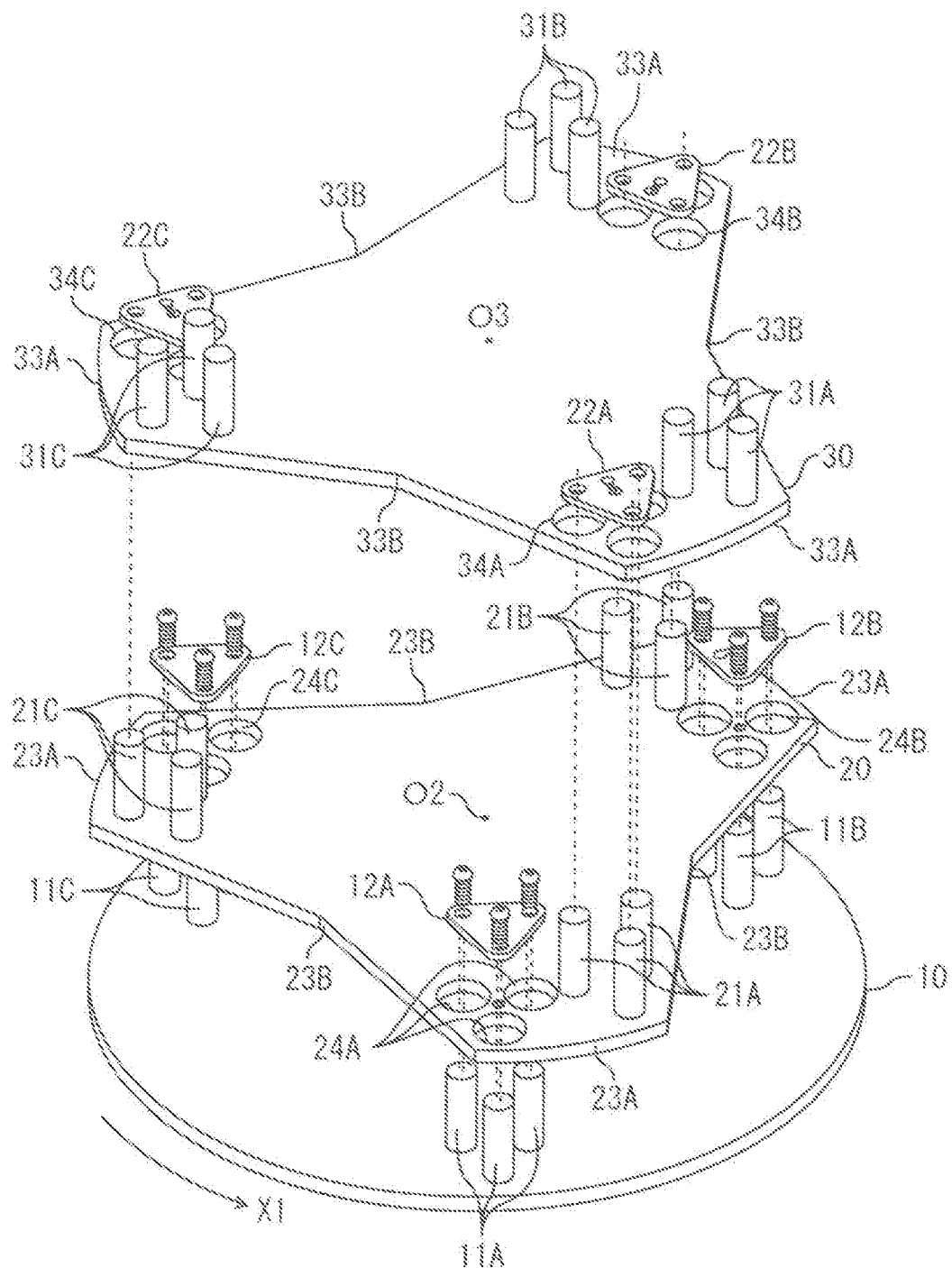
FIG. 3 is a perspective view showing an assembly process for the insulator according to embodiment 1.
Figure 4:
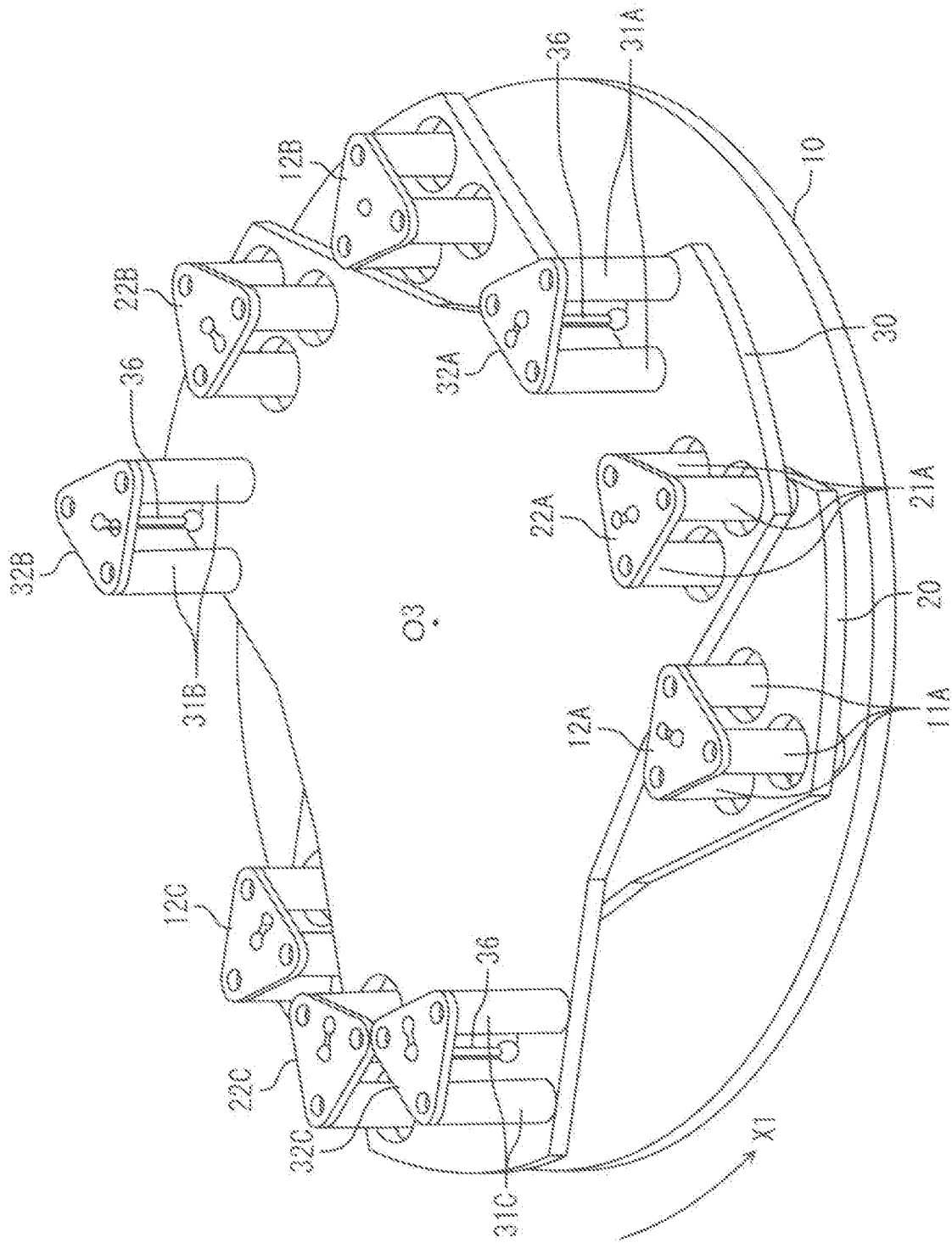
FIG. 4 is a perspective view showing an assembly process for the insulator according to embodiment 1.

FIG. 1 is a perspective view showing the entire structure of an insulator according to embodiment 1. FIG. 2 to FIG. 4 are perspective views showing assembly processes for the insulator according to embodiment 1.

An insulator 1000 of embodiment 1 includes a first plate-shaped member 10, a second plate-shaped member 20, a third plate-shaped member 30, a fourth plate-shaped member 40, and a fifth plate-shaped member 50 which are arranged in this order at multiple stages in the vertical direction. The first plate-shaped member 10, the second plate-shaped member the third plate-shaped member 30, the fourth plate-shaped member 40, and the fifth plate-shaped member 50 at multiple stages are arranged in parallel to each other. The first plate-shaped member 10 is placed on an external surface (not shown) such as a floor, and a mounting base 100 serving as a base for mounting a vibration device (not shown) thereon is attached to the fifth plate-shaped member 50.

First Plate-Shaped Member

FIG. 2 is a perspective view showing an assembly process for the first plate-shaped member of the insulator according to embodiment 1.

As shown in FIG. 2, the first plate-shaped member 10 is a plate-shaped member such as a steel plate having a substantially circular shape in a plan view, and is placed on the external surface such as a floor.

On the first plate-shaped member 10, first support columns 11A, 11B, 11C are attached at a plurality of locations around a reference point O1 which is the center of the substantially circular shape in a plan view, in particular, at positions that are on a circumference centered at the reference point O1 and are three locations near the vertices of a triangle, preferably an equilateral triangle, centered at the reference point O1. The first support columns 11A, 11B, 11C each include three columns.

The first support columns 11A, 11B, 11C penetrate through second through holes 24A, 24B, 24C of the second plate-shaped member 20 described later, and first support plates 12A, 12B, 12C are respectively attached to upper parts of the first support columns 11A, 11B, 11C, by, for example, screwing.

As described later, the first support plates 12A, 12B, 12C are each provided with a first wire 16 (not shown in FIG. 2).

Here, the first support columns 11A, 11B, 11C and the first support plates 12A, 12B, 12C are respectively referred to as first wire support portions 1A, 1B, 1C supporting the first wires 16.

That is, the first support columns 11A and the first support plate 12A are referred to as the first wire support portion 1A. The first support columns 11B and the first support plate 12B are referred to as the first wire support portion 1B. The first support columns 11C and the first support plate 12C are referred to as the first wire support portion 1C.

The first wire support portions 1A, 1B, 1C and the first wires 16 supported by the first wire support portions 1A, 1B, 1C are arranged at a plurality of locations around the reference point O1 of the first plate-shaped member 10, in particular, at positions that are on a circumference centered at the reference point O1 of the first plate-shaped member 10 and are the vertices of a triangle, preferably an equilateral triangle, centered at the reference point O1.

Second Plate-Shaped Member

FIG. 3 is a perspective view showing an assembly process for the first plate-shaped member, the second plate-shaped member, and the third plate-shaped member of the insulator according to embodiment 1.

As shown in FIG. 3, the second plate-shaped member is a plate-shaped member such as a steel plate having three protrusions 23A where the outer periphery thereof protrudes in the radial direction around a reference point O2, and three recesses 23B which are provided between the respective protrusions 23A and where the outer periphery thereof is recessed in the radial direction.

The reference point O2 is located vertically upward of the reference point O1 of the first plate-shaped member 10.

In the protrusions 23A of the second plate-shaped member 20, the second through holes 24A, 24B, 24C through which the first support columns 11A, 11B, 11C of the first plate-shaped member 10 penetrate are provided. The first support plates 12A, 12B, 12C are attached to the upper parts of the first support columns 11A, 11B, 11C penetrating through the second through holes 24A, 24B, 24C, by, for example, screwing.

On the protrusions 23A of the second plate-shaped member 20, second support columns 21A, 21B, 21C are attached at positions adjacent to the second through holes 24A, 24B, 24C in a rotational direction X1 around the reference point O2, by, for example, screwing.

The second support columns 21A, 21B, 21C are attached at a plurality of locations around the reference point O2 of the second plate-shaped member 20, in particular, at positions that are on a circumference centered at the reference point O2 and are three locations near the vertices of a triangle, preferably an equilateral triangle, centered at the reference point O2. The second support columns 21A, 21B, 21C each include three columns.

The second support columns 21A, 21B, 21C penetrate through third through holes 34A, 34B, 34C of the third plate-shaped member 30, and second support plates 22A, 22B, 22C are attached to upper parts of the second support columns 21A, 21B, 21C, by, for example, screwing.

As described later, the second support plates 22A, 22B, 22C are each provided with a second wire 26 (not shown in FIG. 3).

Here, the second support columns 21A, 21B, 21C and the second support plates 22A, 22B, 22C are respectively referred to as second wire support portions 2A, 2B, 2C supporting the second wires 26.

That is, the second support columns 21A and the second support plate 22A are referred to as the second wire support portion 2A. The second support columns 21B and the second support plate 22B are referred to as the second wire support portion 2B. The second support columns 21C and the second support plate 22C are referred to as the second wire support portion 2C.

The second wire support portions 2A, 2B, 2C and the second wires 26 supported by the second wire support portions 2A, 2B, 2C are arranged at a plurality of locations around the reference point O2 of the second plate-shaped member 20, in particular, at positions that are on a circumference centered at the reference point O2 of the second plate-shaped member 20 and are the vertices of a triangle, preferably an equilateral triangle, centered at the reference point O2.

Third Plate-Shaped Member

As shown in FIG. 3, the third plate-shaped member 30 is a plate-shaped member such as a steel plate having three protrusions 33A where the outer periphery thereof protrudes in the radial direction around a reference point O3, and three recesses 33B which are provided between the respective protrusions 33A and where the outer periphery thereof is recessed in the radial direction.

The reference point O3 is located vertically upward of the reference point O1 of the first plate-shaped member 10 and the reference point O2 of the second plate-shaped member 20.

The third plate-shaped member 30 has the same shape as the second plate-shaped member 20 in a plan view. The third plate-shaped member 30 is located upward of the second plate-shaped member 20 so as to be rotated by a predetermined angle (in the present embodiment, 30 degrees) in the rotational direction X1 from the plane position of the second plate-shaped member 20.

In the protrusions 33A of the third plate-shaped member 30, third through holes 34A, 34B, 34C through which the second support columns 21A, 21B, 21C of the second plate-shaped member 20 penetrate are provided. The second support plates 22A, 22B, 22C are attached to the upper parts of the second support columns 21A, 21B, 21C penetrating through the third through holes 34A, 34B, 34C, by, for example, screwing.

On the protrusions 33A of the third plate-shaped member 30, third support columns 31A, 31B, 31C are attached at positions adjacent to the third through holes 34A, 34B, 34C in the rotational direction X1 around the reference point O3, by, for example, screwing.

The third support columns 31A, 31B, 31C are attached at a plurality of locations around the reference point O3 of the third plate-shaped member 30, in particular, at positions that are on a circumference centered at the reference point O3 and are three locations near the vertices of a triangle, preferably an equilateral triangle, centered at the reference point O3. The third support columns 31A, 31B, 31C each include three columns.

The third support columns 31A, 31B, 31C penetrate through fourth through holes 44A, 44B, 44C of the fourth plate-shaped member 40 described later, and third support plates 32A, 32B, 32C are attached to upper parts of the third support columns 31A, 31B, 31C, by, for example, screwing.

As described later, the third support plates 32A, 32B, 32C are each provided with a third wire 36 (shown in FIG. 4).

Here, the third support columns 31A, 31B, 31C and the third support plates 32A, 32B, 32C are respectively referred to as third wire support portions 3A, 3B, 3C supporting the third wires 36.

That is, the third support columns 31A and the third support plate 32A are referred to as the third wire support portion 3A. The third support columns 31B and the third support plate 32B are referred to as the third wire support portion 3B. The third support columns 31C and the third support plate 32C are referred to as the third wire support portion 3C.

The third wire support portions 3A, 3B, 3C and the third wires 36 supported by the third wire support portions 3A, 3B, 3C are arranged at a plurality of locations around the reference point O3 of the third plate-shaped member 30, in particular, at positions that are on a circumference centered at the reference point O3 of the third plate-shaped member 30 and are the vertices of a triangle, preferably an equilateral triangle, centered at the reference point O3.

FIG. 4 shows an assembly process for the insulator of embodiment 1 in which the first plate-shaped member 10, the second plate-shaped member 20, and the third plate-shaped member 30 shown in FIG. 3 are arranged at multiple stages (in this case, three stages) in the vertical direction.

In FIG. 4, the third support plates 32A, 32B, 32C are attached to the upper parts of the third support columns 31A, 31B, 31C provided to the third plate-shaped member 30, and the third wires 36 are attached to the third support plates 32A, 32B, 32C. The third wires 36 are configured to suspend the fourth plate-shaped member 40 (not shown in FIG. 4) located upward of the third plate-shaped member 30.

Although not specifically described above, the first wires 16 attached to the first wire support portions 1A, 1B, 1C are configured to suspend the second plate-shaped member 20. In addition, the second wires 26 attached to the second wire support portions 2A, 2B, 2C are configured to suspend the third plate-shaped member 30. Further, as described later, fourth wires 46 are attached to fourth wire support portions 4A, 4B, 4C, and the fourth wires 46 are configured to suspend the fifth plate-shaped member 50.

The details of the first to fourth wires 16, 26, 36, 46 will be described later with reference to FIG. 5 and FIG. 6.

Next, the fourth plate-shaped member 40, the fifth plate-shaped member 50, and the mounting base 100 located vertically upward of the third plate-shaped member 30 will be described.

Fourth Plate-Shaped Member

In FIG. 1, a part of the fourth plate-shaped member is shown and its entirety is not shown. Therefore, not all the components of the fourth plate-shaped member 40 are shown and the components not shown are described with reference characters assigned according to the components of the first to third plate-shaped members 10, 20, 30 described above.

In FIG. 1, the fourth plate-shaped member 40 is located upward of the third plate-shaped member 30. The fourth plate-shaped member 40 is a plate-shaped member such as a steel plate having three protrusions 43A where the outer periphery thereof protrudes in the radial direction around a reference point O4, and three recesses 43B which are provided between the respective protrusions 43A and where the outer periphery thereof is recessed in the radial direction.

The reference point O4 is located vertically upward of the reference points O1, O2, O3 described above.

The fourth plate-shaped member 40 has the same shape as the second plate-shaped member 20 and the third plate-shaped member 30 in a plan view. The fourth plate-shaped member 40 is located upward of the third plate-shaped member 30 so as to be rotated by a predetermined angle (in the present embodiment, 30 degrees) in the rotational direction X1 from the plane position of the third plate-shaped member 30.

In the protrusions 43A of the fourth plate-shaped member 40, fourth through holes 44A, 44B, 44C through which the third support columns 31A, 31B, 31C of the third plate-shaped member 30 penetrate are provided. The third support plates 32A, 32B, 32C are attached to the upper parts of the third support columns 31A, 31B, 31C penetrating through the fourth through holes 44A, 44B, 44C, by, for example, screwing.

On the protrusions 43A of the fourth plate-shaped member 40, fourth support columns 41A, 41B, 41C are attached at positions adjacent to the fourth through holes 44A, 44B, 44C in the rotational direction X1 around the reference point O4, by, for example, screwing.

The fourth support columns 41A, 41B, 41C are attached at a plurality of locations around the reference point O4 of the fourth plate-shaped member 40, in particular, at positions that are on a circumference centered at the reference point O4 and are three locations near the vertices of a triangle, preferably an equilateral triangle, centered at the reference point O4. The fourth support columns 41A, 41B, 41C each include three columns.

The fourth support columns 41A, 41B, 41C penetrate through fifth through holes 54A, 54B, 54C of the fifth plate-shaped member 50 described later, and fourth support plates 42A, 42B, 42C are attached to upper parts of the fourth support columns 41A, 41B, 41C, by, for example, screwing.

The fourth support plates 42A, 42B, 42C are each provided with the fourth wire 46.

Here, the fourth support columns 41A, 41B, 41C and the fourth support plates 42A, 42B, 42C are respectively referred to as the fourth wire support portions 4A, 4B, 4C supporting the fourth wires 46.

That is, the fourth support columns 41A and the fourth support plate 42A are referred to as the fourth wire support portion 4A. The fourth support columns 41B and the fourth support plate 42B are referred to as the fourth wire support portion 4B. The fourth support columns 41C and the fourth support plate 42C are referred to as the fourth wire support portion 4C.

The fourth wire support portions 4A, 4B, 4C and the fourth wires 46 supported by the fourth wire support portions 4A, 4B, 4C are arranged at a plurality of locations around the reference point O4 of the fourth plate-shaped member 40, in particular, at positions that are on a circumference centered at the reference point O4 of the fourth plate-shaped member 40 and are the vertices of a triangle, preferably an equilateral triangle, centered at the reference point O4.

Fifth Plate-Shaped Member

In FIG. 1, a part of the fifth plate-shaped member is shown and its entirety is not shown. Therefore, not all the components of the fifth plate-shaped member 50 are shown and the components not shown are described with reference characters assigned according to the components of the first to third plate-shaped members 10, 20, 30 described above.

In FIG. 1, the fifth plate-shaped member 50 is located vertically upward of the fourth plate-shaped member 40. The fifth plate-shaped member 50 is a plate-shaped member such as a steel plate having three protrusions 53A where the outer periphery thereof protrudes in the radial direction around a reference point O5, and three recesses 53B which are provided between the respective protrusions 53A and where the outer periphery thereof is recessed in the radial direction.

The reference point O5 is located vertically upward of the reference points O1, O2, O3, O4 described above.

The fifth plate-shaped member 50 has the same shape as the second, third, and fourth plate-shaped members 20, 30, in a plan view. The fifth plate-shaped member 50 is located upward of the fourth plate-shaped member 40 so as to be rotated by a predetermined angle (in the present embodiment, 30 degrees) in the rotational direction X1 from the plane position of the fourth plate-shaped member 40.

In the protrusions 53A of the fifth plate-shaped member 50, the fifth through holes 54A, 54B, 54C through which the fourth support columns 41A, 41B, 41C of the fourth plate-shaped member 40 penetrate are provided. The fourth support plates 42A, 42B, 42C are attached to the upper parts of the fourth support columns 41A, 41B, 41C penetrating through the fifth through holes 54A, 54B, 54C, by, for example, screwing.

On the protrusions 53A of the fifth plate-shaped member 50, fifth support columns 51A, 51B, 51C are attached at positions adjacent to the fifth through holes 54A, 54B, 54C in the rotational direction X1 around the reference point by, for example, screwing.

The fifth support columns 51A, 51B, 51C are attached at a plurality of locations around the reference point O5 of the fifth plate-shaped member 50, in particular, at positions that are on a circumference centered at the reference point O5 of the fifth plate-shaped member 50 and are three locations near the vertices of a triangle, preferably an equilateral triangle, centered at the reference point O5. The fifth support columns 51A, 51B, 51C each include three columns.

Mounting Base

As shown in FIG. 1, the mounting base 100 is located vertically upward of the fifth plate-shaped member The mounting base 100 is a base such as a steel plate having three protrusions where the outer periphery thereof protrudes in the radial direction around a reference point O10 and three recesses which are provided between the respective protrusions and where the outer periphery thereof is recessed in the radial direction.

The reference point O10 is located vertically upward of the reference points O1, O2, O3, O4, O5 described above.

The mounting base 100 has the same shape as the second, third, fourth, and fifth plate-shaped members 20, 30, 40, 50 in a plan view. The mounting base 100 is located upward of the fifth plate-shaped member 50 so as to be rotated by a predetermined angle (in the present embodiment, 30 degrees) in the rotational direction X1 from the plane position of the fifth plate-shaped member 50.

The mounting base 100 is attached to the fifth support columns 51A, 51B, 51C provided to the fifth plate-shaped member 50, by, for example, screwing.

The mounting base 100 serves as a base for mounting a vibration device (not shown) thereon.

As described also in another embodiment later, the mounting base 100 may not necessarily have the same shape as the second, third, fourth, and fifth plate-shaped members 20, 30, 40, 50 in a plan view.

In a case where the mounting base 100 has the same shape as the second, third, fourth, and fifth plate-shaped members 20, 30, 40, 50 in a plan view, there is an advantage that plate-shaped members having the same shape can be used in common.

Structures of Wire Support Portions and Wires in Embodiment 1

Next, the details of the wire support portions and the wires of the insulator of embodiment 1 will be described.

Figure 5:
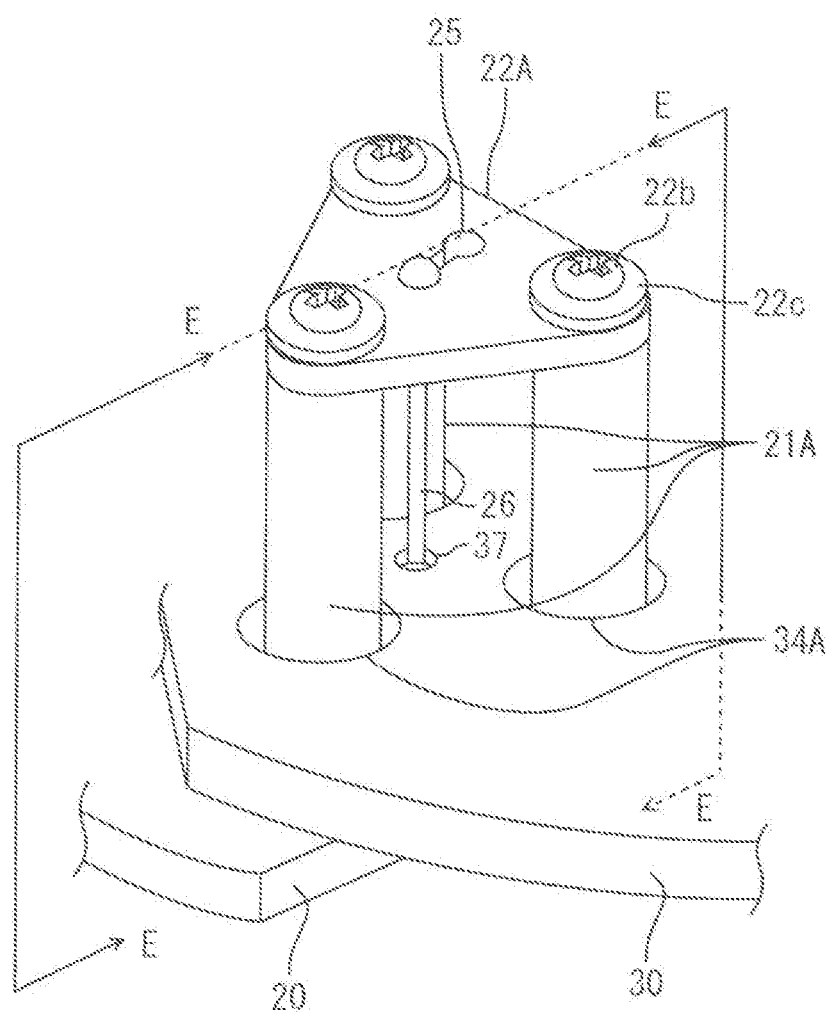
FIG. 5 is an enlarged perspective view showing a wire support portion and a wire of the insulator of embodiment 1.

FIG. 5 is an enlarged perspective view showing the wire support portion and the wire of the insulator of embodiment 1, and shows a part D in FIG. 1. FIG. 6 shows a cross-section along line E-E in FIG. 5. FIG. 7 is a plan view showing the wire support portion of embodiment 1. In FIG. 7, the wire is not shown.

Figure 6:
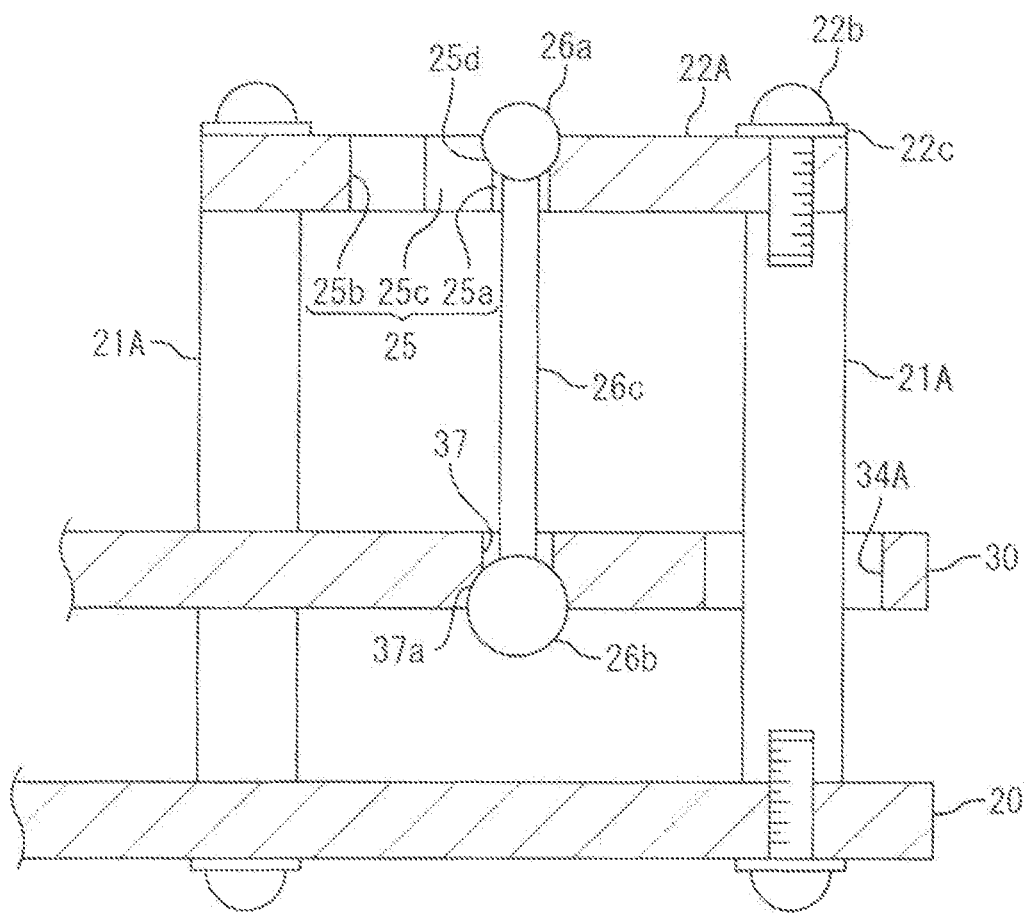
FIG. 6 shows a cross-section along line E-E in FIG. 5.
Figure 7:
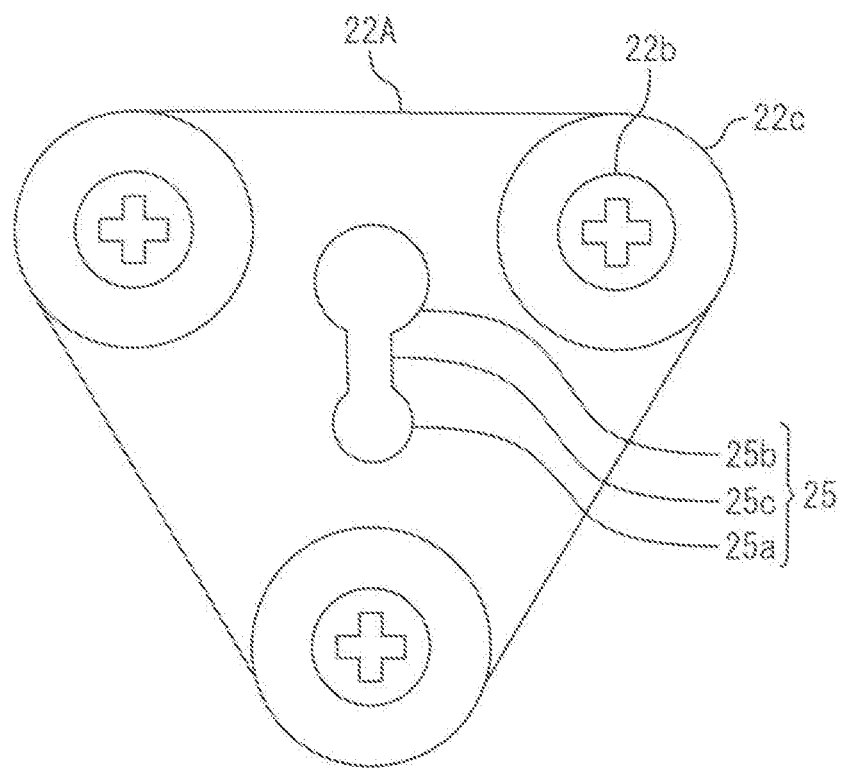
FIG. 7 is a plan view showing a wire support plate of the wire support portion of embodiment 1.

In FIG. 5, FIG. 6, and FIG. 7, the structures of the second support columns 21A and the second support plate 22A which form the second wire support portion 2A, and the second wire 26, are described as a representative example. However, the second support columns 21B, 21C, the second support plates 22B, 22C, and the other second wires 26 of the second plate-shaped member 20 also have the same structures. In addition, the first support columns 11A, 11B, 11C and the first support plates 12A, 12B, 12C which form the first wire support portions, and the first wires 16, also have the same structures. In addition, the third support columns 31A, 31B, 31C and the third support plates 32A, 32B, 32C which form the third wire support portions, and the third wires 36, also have the same structures. Further, the fourth support columns 41A, 41B, 41C and the fourth support plates 42A, 42B, 42C which form the fourth wire support portions, and the fourth wires 46, also have the same structures.

As shown in FIG. 5, FIG. 6, and FIG. 7, the three second support columns 21A provided to the second plate-shaped member 20 penetrate through the third through holes 34A of the third plate-shaped member 30. The second support plate 22A is attached to the upper parts of the second support columns 21A penetrating through the third through holes 34A, by, for example, screws 22b and washers 22c.

The second support plate 22A has a triangle shape, preferably an equilateral triangle shape, in a plan view. The three second support columns 21A are attached substantially near the vertices of the triangle shape of the second support plate 22A in a plan view.

An engagement hole 25 is provided near the center of the second support plate 22A in a plan view. The engagement hole 25 has a first hole 25a, a second hole 25b, and a connection hole 25c connecting the first hole 25a and the second hole 25b. The first hole 25a has a smaller hole diameter than the second hole 25b.

The second wire 26 has a straight portion 26c formed by stranding a plurality of steel wires (e.g., molybdenum steel wires), a first spherical portion 26a provided at an upper part of the straight portion 26c, and a second spherical portion 26b provided at a lower part of the straight portion 26c. The first spherical portion 26a is formed to be smaller than the second spherical portion 26b.

The second wire 26 may be formed by stranding a plurality of thin wires made of another metal material, or may be a single wire made of a metal material.

The thickness of the second wire 26 needs to have a mechanical strength required in consideration of a mechanical property of the material quality of the metal material and the weight of the vibration device. The length of the second wire 26 will be described later.

The first hole 25a of the engagement hole 25 has such a size that does not allow the first spherical portion 26a of the second wire 26 to pass therethrough, and the second hole 25b has such a size that allows the first spherical portion 26a to pass therethrough. The connection hole 25c has such a size that does not allow the first spherical portion 26a to pass therethrough but allows the straight portion 26c of the second wire 26 to pass therethrough.

The first spherical portion 26a of the second wire 26 is engaged with a bowl-shaped seat surface 25d provided at an upper part of the first hole 25a of the second support plate 22A.

The third plate-shaped member 30 is provided with a support hole 37 having such a size that allows the first spherical portion 26a of the second wire 26 to pass therethrough but does not allow the second spherical portion 26b to pass therethrough.

The second spherical portion 26b of the second wire 26 is engaged with a bowl-shaped seat surface 37a at a lower part of the support hole 37 of the third plate-shaped member thus suspending the third plate-shaped member 30 by the second wire 26.

Here, a method for attaching the second wire 26 to the second support plate 22A and the third plate-shaped member 30 will be described.

First, the first spherical portion 26a and the straight portion 26c of the second wire 26 are passed through the support hole 37 of the third plate-shaped member 30 from the lower side to the upper side, and the second spherical portion 26b of the second wire 26 is engaged with the bowl-shaped seat surface 37a at the lower part of the support hole 37 of the third plate-shaped member 30.

Next, the first spherical portion 26a of the second wire 26 is passed through the second hole 25b of the second support plate 22A from the lower side to the upper side, and then the straight portion 26c of the second wire 26 is passed through the connection hole 25c.

Next, the first spherical portion 26a of the second wire 26 is engaged with the bowl-shaped seat surface 25d provided at the upper part of the first hole 25a of the second support plate 22A.

As described above, the second wire 26 has the first spherical portion 26a engaged with the seat surface 25d of the second support plate 22A, and the second spherical portion 26b engaged with the seat surface 37a of the third plate-shaped member 30, whereby the second wire 26 serves to suspend the third plate-shaped member 30 as a pendulum.

In the present embodiment, the frequency of free vibration of the pendulum motion is set to about 3.57 Hz, for example, and accordingly, the length of the straight portion 26c of the second wire 26 is set to about 17 mm and the total length of the first spherical portion 26a, the straight portion 26c, and the second spherical portion 26b is set to about 20 mm.

In the present embodiment, the first support plates 12A, 12B, 12C, the second support plates 22A, 22B, 22C, the third support plates 32A, 32B, 32C, and the fourth support plates 42A, 42B, 42C each have a triangular shape, preferably an equilateral triangle shape, in a plan view, and three support columns are attached substantially near the vertices of the triangular shape of each support plate in a plan view. Near the center of each support plate in a plan view, the engagement hole with which the wire is engaged is provided. By adopting such a structure, it is possible to stably support each wire by the three support columns and the support plate.

However, the shape of each support plate is not limited to the above shape, and the number of the support columns for each support plate is not limited to three. For example, each support plate may have a quadrangular shape in a plan view, and four support columns may be attached substantially near the vertices of the quadrangular shape of each support plate in a plan shape. The engagement hole for the wire may be provided near the center among the four support columns. Alternatively, one support plate may be supported by two support columns, and the engagement hole for the wire may be provided at the middle between the two support columns.

Plan View of Insulator of Embodiment 1

Figure 8:
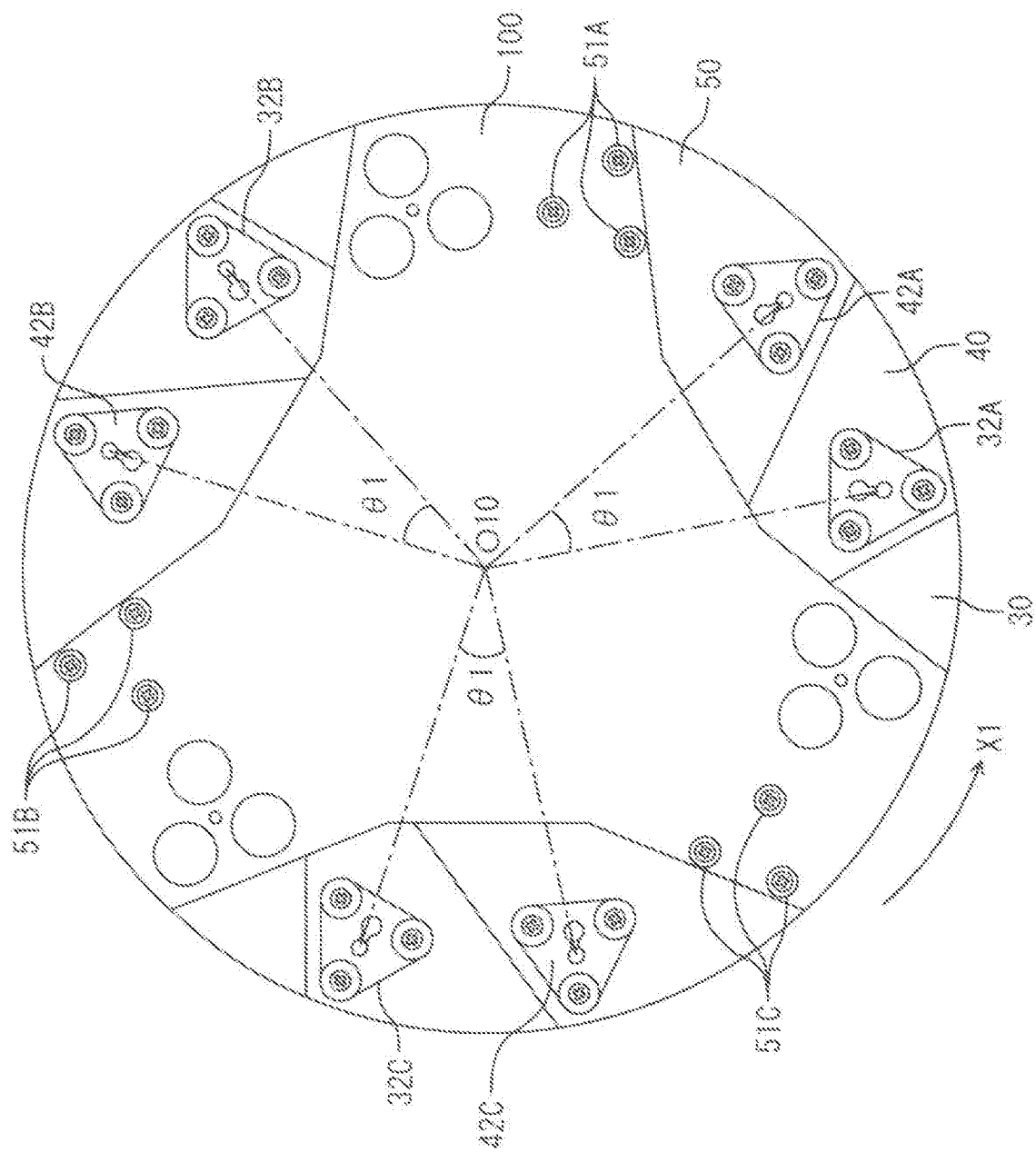
FIG. 8 is a plan view of the insulator according to embodiment 1, as seen from above.

FIG. 8 is a plan view of the insulator according to embodiment 1, as seen from above.

In FIG. 8, a part seen in the topmost side is the mounting base 100, and the fifth plate-shaped member 50, the fourth plate-shaped member 40, and the third plate-shaped member 30 are seen on the underside. The second plate-shaped member 20 and the first plate-shaped member 10 are not seen in FIG. 8.

The third plate-shaped member 30 is located upward of the second plate-shaped member 20 so as to be rotated by a predetermined angle (in the present embodiment, 30 degrees) in the rotational direction X1 from the plane position of the second plate-shaped member 20. The fourth plate-shaped member 40 is located upward of the third plate-shaped member 30 so as to be rotated by a predetermined angle (in the present embodiment, 30 degrees) in the rotational direction X1 from the plane position of the third plate-shaped member 30. The fourth plate-shaped member 40 is located upward of the third plate-shaped member 30 so as to be rotated by a predetermined angle (in the present embodiment, 30 degrees) in the rotational direction X1 from the plane position of the third plate-shaped member 30. The fifth plate-shaped member 50 is located upward of the fourth plate-shaped member 40 so as to be rotated by a predetermined angle (in the present embodiment, 30 degrees) in the rotational direction X1 from the plane position of the fourth plate-shaped member 40. The mounting base 100 is located upward of the fifth plate-shaped member 50 so as to be rotated by a predetermined angle (in the present embodiment, 30 degrees) in the rotational direction X1 from the plane position of the fifth plate-shaped member 50.

As a result, the first support columns 11A, 11B, 11C of the first plate-shaped member 10 are located vertically downward of the fifth support columns 51A, 51B, 51C of the fifth plate-shaped member 50, so that arrangement of the support columns provided to the respective plate-shaped members is well balanced.

Shapes of Plate-Shaped Members of Embodiment 1

In the present embodiment, the second plate-shaped member 20 is a plate-shaped member having three protrusions 23A where the outer periphery thereof protrudes in the radial direction, and three recesses 23B where the outer periphery thereof is recessed in the radial direction. The third plate-shaped member 30 is a plate-shaped member having three protrusions 33A where the outer periphery thereof protrudes in the radial direction, and three recesses 33B where the outer periphery thereof is recessed in the radial direction. The fourth plate-shaped member 40 is a plate-shaped member having three protrusions 43A where the outer periphery thereof protrudes in the radial direction, and three recesses 43B where the outer periphery thereof is recessed in the radial direction. The fifth plate-shaped member 50 is a plate-shaped member having three protrusions 53A where the outer periphery thereof protrudes in the radial direction, and three recesses 53B where the outer periphery thereof is recessed in the radial direction.

The reason why each plate-shaped member is provided with the recesses where the outer periphery thereof is recessed in the radial direction as described above is that the wire support portion (support columns and support plate) located on the lower side of each plate-shaped member can be prevented from interfering with the plate-shaped member.

For example, in FIG. 1, since the fifth plate-shaped member 50 is provided with the recess 53B, even if the third wire support portion 3A (third support columns 31A and third support plate 32A) of the third plate-shaped member 30 and the second wire support portion 2A (second support columns 21A and second support plate 22A) of the second plate-shaped member 20 which are located on the lower side of the fifth plate-shaped member 50 have heights to a certain extent, these do not interfere with the fifth plate-shaped member 50.

That is, even if the wire support portion suspending the wire becomes high to a certain extent in order to ensure a required length of the wire, the wire support portion does not interfere with the plate-shaped member located on the upper side thereof. As a result, the entire height of the insulator does not become great and thus the insulator can be designed to be compact.

In a case where the height between the respective plate-shaped members, i.e., the entire height of the insulator may be increased, each plate-shaped member need not be provided with such recesses where the outer periphery thereof is recessed in the radial direction.

Modification of Embodiment 1

Figure 9:
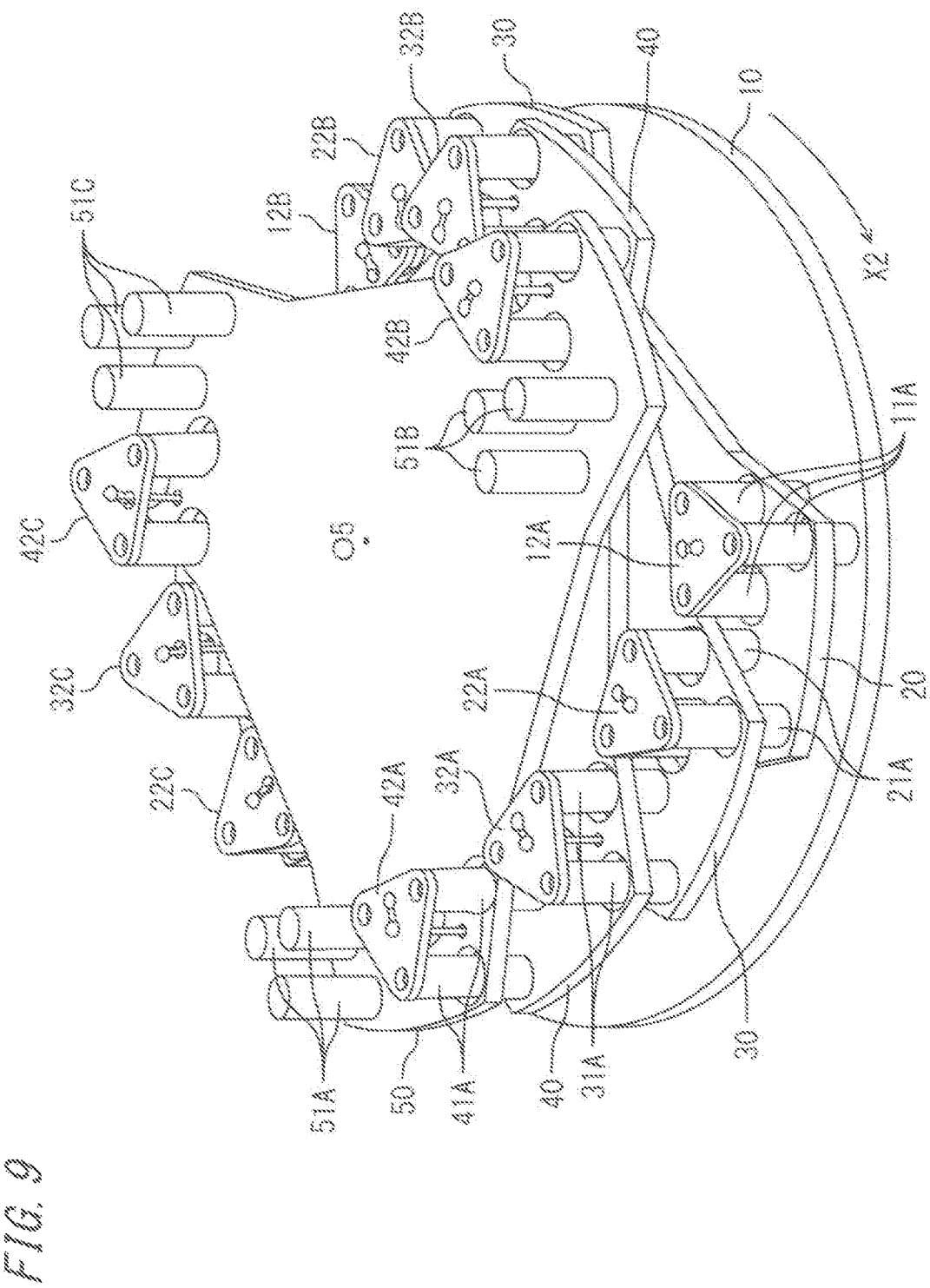
FIG. 9 is a perspective view showing a modification of the insulator according to embodiment 1.

FIG. 9 is a perspective view showing a modification of the insulator according to embodiment 1.

In the insulator shown in FIG. 1 to FIG. 8, the second support columns 21A, 21B, 21C are attached at positions adjacent to the second through holes 24A, 24B, 24C in the rotational direction X1 on the second plate-shaped member 20, the third support columns 31A, 31B, 31C are attached at positions adjacent to the third through holes 34A, 34B, 34C in the rotational direction X1 on the third plate-shaped member 30, and the fourth support columns 41A, 41B, 41C are attached at positions adjacent to the fourth through holes 44A, 44B, 44C in the rotational direction X1 on the fourth plate-shaped member 40. The third plate-shaped member 30 is located upward of the second plate-shaped member 20 so as to be rotated in the rotational direction X1 from the plane position of the second plate-shaped member 20, and the fourth plate-shaped member 40 is located upward of the third plate-shaped member 30 so as to be rotated in the rotational direction X1 from the plane position of the third plate-shaped member 30.

However, a similar configuration can be applied even in a case where, as shown in FIG. 9, the rotational direction is a rotational direction X2 which is opposite to the rotational direction X1 shown in FIG. 1. That is, in FIG. 9, the second support columns 21A, 21B, 21C may be attached at positions adjacent to the second through holes 24A, 24B, 24C in the rotational direction X2 on the second plate-shaped member 20, the third support columns 31A, 31B, 31C may be attached at positions adjacent to the third through holes 34A, 34B, 34C in the rotational direction X2 on the third plate-shaped member 30, and the fourth support columns 41A, 41B, 41C may be attached at positions adjacent to the fourth through holes 44A, 44B, 44C in the rotational direction X2 on the fourth plate-shaped member 40. The third plate-shaped member 30 may be located upward of the second plate-shaped member 20 so as to be rotated in the rotational direction X2 from the plane position of the second plate-shaped member 20, and the fourth plate-shaped member 40 may be located upward of the third plate-shaped member 30 so as to be rotated in the rotational direction X2 from the plane position of the third plate-shaped member 30.

Overall Expression of Insulator of Present Disclosure

The insulator of embodiment 1 described above includes the first plate-shaped member 10, the second plate-shaped shaped member 20, the third plate-shaped member 30, the fourth plate-shaped member 40, and the fifth plate-shaped member 50 which are arranged in this order at multiple stages in the vertical direction, and each plate-shaped member is provided with the wire support portions (support columns and support plates), the wires, and the through holes.

In the insulator of the present disclosure, the number of the plate-shaped members arranged at multiple stages, and the numbers of the wire support portions (support columns and support plates), the wires, and the through holes provided to the plate-shaped members, are not limited to the above ones, and can be expressed overall, as follows.

That is, the insulator of the present disclosure can be expressed as

"an insulator which is disposed between a vibration device and an external surface and inhibits vibration transmission between the vibration device and the external surface, the insulator comprising:

N plate-shaped members which are first to Nth plate-shaped members and are arranged in this order at multiple stages such that reference points on the respective plate-shaped members are aligned in a vertical direction, N being an integer not less than 3, wherein the plate-shaped member for a kth number counted from the first plate-shaped member is defined as a kth plate-shaped shaped member, k being all integers not less than 2 and not greater than N−1, the first plate-shaped member is provided with a first wire support portion, the kth plate-shaped member is provided with a kth through hole through which a (k−1)th wire support portion provided to the (k−1)th plate-shaped member penetrates, a (k−1)th wire suspending the kth plate-shaped member is provided at an upper part of the (k−1)th wire support portion penetrating through the kth through hole, and a kth wire support portion is provided at a position adjacent to the kth through hole in a predetermined rotational direction around the reference point on the kth plate-shaped member, the Nth plate-shaped member is provided with an Nth through hole through which an (N−1)th wire support portion provided to the (N−1)th plate-shaped member penetrates, an (N−1)th wire suspending the Nth plate-shaped member is provided at an upper part of the (N−1)th wire support portion penetrating through the Nth through hole, and a mounting base for mounting the vibration device thereon is attached to the Nth plate-shaped member, the first wire support portions on the first plate-shaped member and the first wires thereof are arranged at a plurality of locations around the reference point on the first plate-shaped member, and the kth wire support portions on the kth plate-shaped member and the kth wires thereof are arranged at a plurality of locations around the reference point on the kth plate-shaped member".

The insulator of embodiment 1 shown in FIG. 1 to FIG. 9 corresponds to the insulator in a case of N=5 and k=2, 3, 4 in the above overall expression.

That is, the insulator of embodiment 1 is expressed as

"an insulator which is disposed between a vibration device and an external surface and inhibits vibration transmission between the vibration device and the external surface, the insulator comprising:

five plate-shaped members which are first, second, third, fourth, and fifth plate-shaped members and are arranged in this order at multiple stages such that reference points on the respective plate-shaped members are aligned in a vertical direction, wherein the first plate-shaped member is provided with a first wire support portion, the second plate-shaped member is provided with a second through hole through which the first wire support portion provided to the first plate-shaped member penetrates, a first wire suspending the second plate-shaped member is provided at an upper part of the first wire support portion penetrating through the second through hole, and a second wire support portion is provided at a position adjacent to the second through hole in a predetermined rotational direction around the reference point on the second plate-shaped member, the third plate-shaped member is provided with a third through hole through which the second wire support portion provided to the second plate-shaped member penetrates, a second wire suspending the third plate-shaped member is provided at an upper part of the second wire support portion penetrating through the third through hole, and a third wire support portion is provided at a position adjacent to the third through hole in the predetermined rotational direction around the reference point on the third plate-shaped member, the fourth plate-shaped member is provided with a fourth through hole through which the third wire support portion provided to the third plate-shaped member penetrates, a third wire suspending the fourth plate-shaped member is provided at an upper part of the third wire support portion penetrating through the fourth through hole, and a fourth wire support portion is provided at a position adjacent to the fourth through hole in the predetermined rotational direction around the reference point on the fourth plate-shaped member, the fifth plate-shaped member is provided with a fifth through hole through which the fourth wire support portion provided to the fourth plate-shaped member penetrates, a fourth wire suspending the fifth plate-shaped member is provided at an upper part of the fourth wire support portion penetrating through the fifth through hole, and a mounting base for mounting the vibration device thereon is attached to the fifth plate-shaped member, the first wire support portions on the first plate-shaped member and the first wires thereof are arranged at a plurality of locations around the reference point on the first plate-shaped member, the second wire support portions on the second plate-shaped member and the second wires thereof are arranged at a plurality of locations around the reference point on the second plate-shaped member, the third wire support portions on the third plate-shaped member and the third wires thereof are arranged at a plurality of locations around the reference point on the third plate-shaped member, and the fourth wire support portions on the fourth plate-shaped member and the fourth wires thereof are arranged at a plurality of locations around the reference point on the fourth plate-shaped member".

As described above, the insulator of embodiment 1 shown in FIG. 1 to FIG. 9 corresponds to the case of N=5 and k=2, 3, 4 in the overall expression, i.e., the insulator having a structure in which the second plate-shaped member is suspended by the first wire support portions and the first wires provided to the first plate-shaped member, the third plate-shaped member is suspended by the second wire support portions and the second wires provided to the second plate-shaped member, the fourth plate-shaped member is suspended by the third wire support portions and the third wires provided to the third plate-shaped member, and the fifth plate-shaped member is suspended by the fourth wire support portions and the fourth wires provided to the fourth plate-shaped member, and thus the plate-shaped members at four stages which are the second, third, fourth, and fifth plate-shaped members are suspended by the wires.

However, without limitation to the above, the present disclosure is also applicable to a case of N=3 and k=2. In this case, the insulator has a structure in which the second plate-shaped member is suspended by the first wire support portions and the first wires provided to the first plate-shaped member, and the third plate-shaped member is suspended by the second wire support portions and the second wires provided to the second plate-shaped member, and thus the plate-shaped members at two stages which are the second and third plate-shaped members are suspended by the wires.

Further, the present disclosure is also applicable to a case of N=4 and k=2, 3. In this case, the insulator has a structure in which the second plate-shaped member is suspended by the first wire support portions and the first wires provided to the first plate-shaped member, the third plate-shaped member is suspended by the second wire support portions and the second wires provided to the second plate-shaped member, and the fourth plate-shaped member is suspended by the third wire support portions and the third wires provided to the third plate-shaped member, and thus the plate-shaped members at three stages which are the second, third, and fourth plate-shaped members are suspended by the wires.

In addition, the present disclosure is also applicable to a case of N=6 and k=2, 3, 4, 5. In this case, the insulator has a structure in which the second plate-shaped member is suspended by the first wire support portions and the first wires provided to the first plate-shaped member, the third plate-shaped member is suspended by the second wire support portions and the second wires provided to the second plate-shaped member, the fourth plate-shaped member is suspended by the third wire support portions and the third wires provided to the third plate-shaped member, the fifth plate-shaped member is suspended by the fourth wire support portions and the fourth wires provided to the fourth plate-shaped member, and the sixth plate-shaped member is suspended by the fifth wire support portions and the fifth wires provided to the fifth plate-shaped member, and thus the plate-shaped members at five stages which are the second, third, fourth, fifth, and sixth plate-shaped members are suspended by the wires.

Further, the present disclosure is also applicable to a case where N is not less than 7 and k is all integers not less than 2 and not greater than N−1. In this case, the plate-shaped members at (N−2) stages which are the second, third, ..., (N−1)th plate-shaped members are suspended by the wires.

Effects of Present Disclosure

As described above, the insulator of the present disclosure includes N plate-shaped members which are first to Nth plate-shaped members (N is an integer not less than 3) and are arranged at multiple stages, and between the respective plate-shaped members, the wires attached to the wire support portions of the plate-shaped member located at a lower stage suspend the plate-shaped member located at an upper stage, thus having a so-called multistage suspension structure. Therefore, vibration generated by the vibration device can be inhibited from being directly transmitted to the external surface and vibration from the external surface can be inhibited from being directly transmitted to the vibration device, more effectively than with a single-stage suspension structure.

In addition, as the number of stages in the multistage suspension structure is increased, vibration generated by the vibration device can be more inhibited from being directly transmitted to the external surface, and vibration from the external surface can be more inhibited from being directly transmitted to the vibration device.

For example, if the insulator of the present disclosure is used for an acoustic device such as a speaker, a CD player, an LD player, a record player, or a power amplifier, unnecessary sound distortion and unnecessary vibration can be eliminated, whereby it is possible to listen to comfortable live performance or the like as it is.

Alternatively, if the insulator of the present disclosure is used for a computer device such as a hard disk or a calculator, error or the like can be eliminated.

In addition, the first wire support portions on the first plate-shaped member and the first wires thereof are arranged at a plurality of locations on a circumference centered at the reference point on the first plate-shaped member, and the kth wire support portions on the kth plate-shaped member and the kth wires thereof (in embodiment 1, k=2, 3, 4) are arranged at a plurality of locations on a circumference centered at the reference point on the kth plate-shaped member.

Thus, at the respective plate-shaped members, the wire support portions and the wires are arranged in a well-balanced manner, whereby vibration transmission between the vibration device and the external surface can be inhibited in a well-balanced manner.

In addition, the first wire support portions on the first plate-shaped member and the first wires thereof are arranged at vertices of an M-gon centered at the reference point on the first plate-shaped member, M being an integer not less than 3 (in embodiment 1, M=3), and the kth wire support portions on the kth plate-shaped member and the kth wires thereof (in embodiment 1, k=2, 3, 4) are arranged at vertices of the M-gon centered at the reference point on the kth plate-shaped member.

Thus, at the respective plate-shaped members, the wire support portions and the wires are arranged in a well-balanced manner, whereby vibration transmission between the vibration device and the external surface can be inhibited in a well-balanced manner.

In addition, the M-gon (embodiment 1, M=3) is a regular M-gon.

Thus, at the respective plate-shaped members, the wire support portions and the wires are arranged in a well-balanced manner, whereby vibration transmission between the vibration device and the external surface can be effectively inhibited.

In addition, the vertices of the regular M-gon where the kth wire support portions on the kth plate-shaped member and the kth wires thereof are arranged, and the vertices of the regular M-gon where the (k−1)th wire support portions on the (k−1)th plate-shaped member and the (k−1)th wires thereof are arranged, are shifted from each other in the predetermined rotational direction by an angle of 360/M·p degrees around the reference points on the kth plate-shaped member and the (k−1)th plate-shaped member, p being an integer not less than 2.

Thus, arrangement of the wire support portions and the wires provided to the respective plate-shaped members is well balanced, whereby vibration transmission between the vibration device and the external surface can be effectively inhibited.

For example, as shown in FIG. 8 in embodiment 1, the vertices of the equilateral triangle where the wire support portions on the plate-shaped member at the upper stage and the wires thereof are arranged, and the vertices of the equilateral triangle where the wire support portions on the plate-shaped member at the lower stage and the wires thereof are arranged, are shifted from each other in the predetermined rotational direction by θ1=360/3.4=30 degrees (M=3, p=4) around the reference points.

Thus, arrangement of the wire support portions and the wires provided to the respective plate-shaped members is well balanced, whereby vibration transmission between the vibration device and the external surface can be effectively inhibited.

In addition, the second, . . . , Nth plate-shaped members (in embodiment 1, N=5) each have M protrusions where an outer periphery thereof protrudes in a radial direction around the reference point on the plate-shaped member (in embodiment 1, M=3), and M recesses which are provided between the respective protrusions and where the outer periphery thereof is recessed in the radial direction.

Thus, the entire height of the insulator can be reduced.

In addition, the (k−1)th wire support portions (embodiment 1, k=2, 3, 4) each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and the (N−1)th wire support portions (in embodiment 1, N=5) each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

Thus, each wire support portion can assuredly support the corresponding wire.

In addition, the second to Nth plate-shaped members are plate-shaped members having the same shape, the first to (N−1)th wire support portions are wire support portions having the same structure, and the first to (N−1)th wires are wires having the same shape.

Thus, the kinds of parts composing the insulator can be decreased, so that assembling of the insulator is simplified and facilitated.

Embodiment 2

In embodiment 1, each of the second to fifth plate-shaped members is a plate-shaped member having three protrusions where the outer periphery thereof protrudes in the radial direction, and three recesses where the outer periphery thereof is recessed in the radial direction.

In addition, the first to fourth wire support portions provided to the first to fourth plate-shaped members are attached at positions that are on a circumference centered at the reference point of each plate-shaped member and are three locations near the vertices of a triangle, preferably an equilateral triangle, centered at the reference point.

However, the shapes of the plate-shaped members are not limited to the above ones, and the positions of the wire support portions provided to each plate-shaped member are not limited to the above ones.

Figure 10:
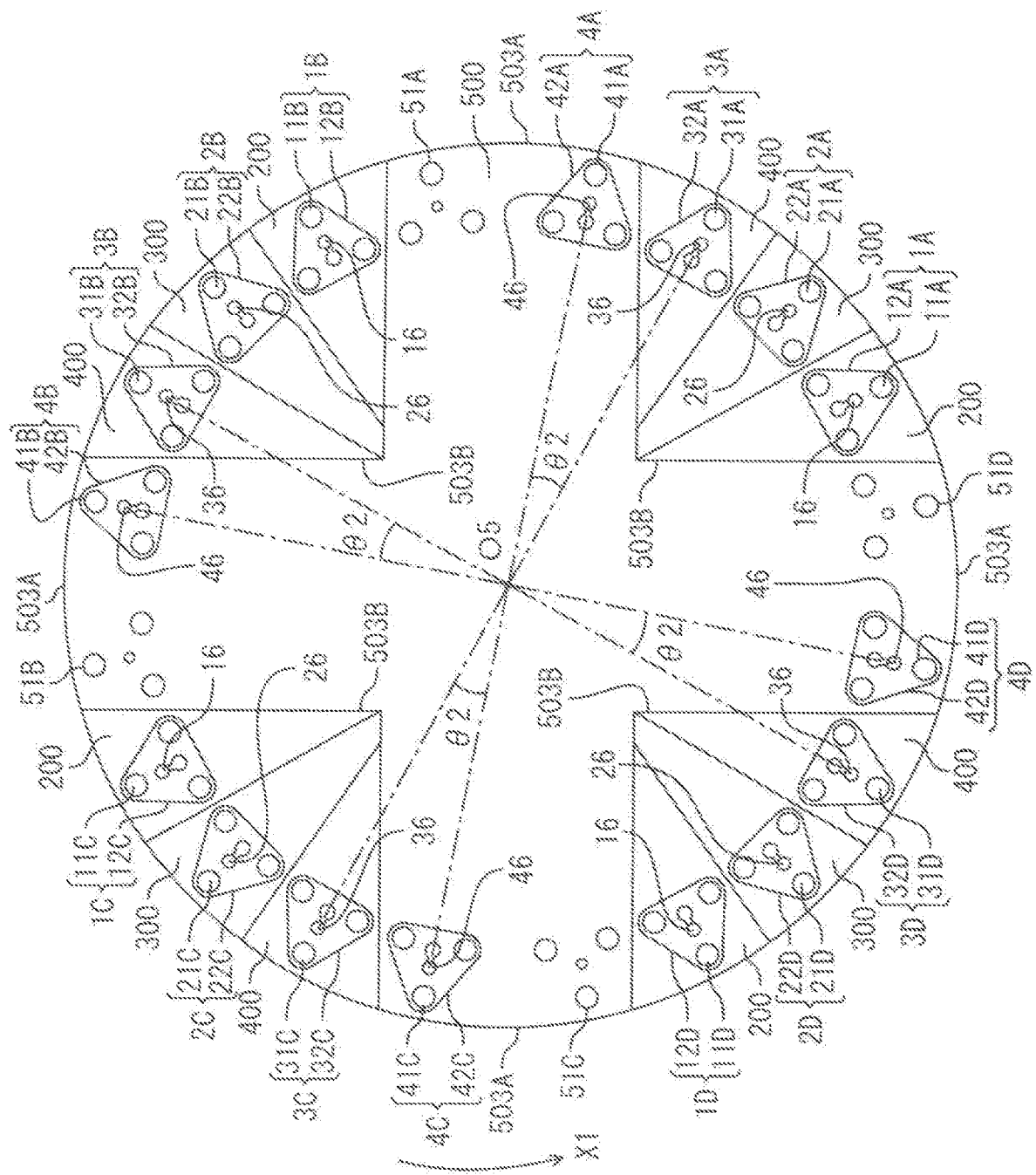
FIG. 10 is a plan view of an insulator according to embodiment 2, as seen from above.

FIG. 10 is a plan view of an insulator according to embodiment 2, as seen from above.

The insulator according to embodiment 2 includes the first plate-shaped member 10, a second plate-shaped member 200, a third plate-shaped member 300, a fourth plate-shaped member 400, and a fifth plate-shaped member 500 which are arranged in this order at multiple stages in the vertical direction. Although not shown in FIG. 10, the first plate-shaped member 10 has the same shape as in embodiment 1, and is placed on an external surface such as a floor. A mounting base (not shown) serving as a base for mounting a vibration device thereon is attached to the fifth plate-shaped member 500.

The following description is given with reference to only FIG. 10 which is a plan view of the insulator according to embodiment 2, and not all the components are shown. Therefore, the components not shown are described with reference characters assigned according to the components of the insulator of embodiment 1 described above.

First Plate-Shaped Member

Although not shown in FIG. 10, the first plate-shaped member 10 is a plate-shaped member such as a steel plate having a circular shape in a plan view and is placed on the external surface such as a floor, as described in embodiment 1.

On the first plate-shaped member 10, first support columns 11A, 11B, 11C, 11D are attached at positions that are on a circumference centered at the reference point O1 and are four locations near the vertices of a quadrangle, preferably a square, centered at the reference point O1. The first support columns 11A, 11B, 11C, 11D each include three columns.

The first support columns 11A, 11B, 11C, 11D penetrate through second through holes 24A, 24B, 24C, 24D of the second plate-shaped member 200, and first support plates 12A, 12B, 12C, 12D are respectively attached to upper parts of the first support columns 11A, 11B, 11C, 11D, by, for example, screwing.

The first support plates 12A, 12B, 12C, 12D are each provided with a first wire 16. The first wire 16 is configured to suspend the second plate-shaped member 200.

Here, the first support columns 11A, 11B, 11C, 11D and the first support plates 12A, 12B, 12C, 12D are respectively referred to as first wire support portions 1A, 1B, 1C, 1D supporting the first wires 16.

The first wire support portions 1A, 1B, 1C, 1D and the first wires 16 are arranged at a plurality of locations around the reference point O1 of the first plate-shaped member 10, in particular, at positions that are on a circumference centered at the reference point O1 of the first plate-shaped member 10 and are near the vertices of a triangle, preferably an equilateral triangle, centered at the reference point O1.

Second Plate-Shaped Member

The second plate-shaped member 200 is a plate-shaped member having a cross shape and having four protrusions where the outer periphery thereof protrudes in the radial direction around the reference point O2 (not shown), and four recesses which are provided between the respective protrusions and where the outer periphery thereof is recessed in the radial direction.

In the protrusions of the second plate-shaped member 200, the second through holes 24A, 24B, 24C, 24D (not shown) through which the first support columns 11A, 11B, 11C, 11D of the first plate-shaped member 10 penetrate are provided. The first support plates 12A, 12B, 12C, 12D are attached to the upper parts of the first support columns 11A, 11B, 11C, 11D penetrating through the second through holes 24A, 24B, 24C, 24D, by, for example, screwing.

On the protrusions of the second plate-shaped member 200, second support columns 21A, 21B, 21C, 21D are attached at positions adjacent to the second through holes 24A, 24B, 24C, 24D in the rotational direction X1 around the reference point O2, by, for example, screwing.

The second support columns 21A, 21B, 21C, 21D are attached at positions that are on a circumference centered at the reference point O2 of the second plate-shaped member 200 and are four locations near the vertices of a quadrangle, preferably a square, centered at the reference point O2. The second support columns 21A, 21B, 21C, 21D each include three columns.

The second support columns 21A, 21B, 21C, 21D penetrate through third through holes 34A, 34B, 34C, 34D (not shown) of the third plate-shaped member 300, and second support plates 22A, 22B, 22C, 22D are attached to upper parts of the second support columns 21A, 21B, 21C, 21D, by, for example, screwing.

The second support plates 22A, 22B, 22C, 22D are each provided with a second wire 26. The second wire 26 is configured to suspend the third plate-shaped member 300.

Here, the second support columns 21A, 21B, 21C, 21D and the second support plates 22A, 22B, 22C, 22D are respectively referred to as second wire support portions 2A, 2B, 2C, 2D supporting the second wires 26.

The second wire support portions 2A, 2B, 2C, 2D and the second wires 26 are arranged at positions that are on a circumference centered at the reference point O2 of the second plate-shaped member 200 and are near the vertices of a quadrangle, preferably a square, centered at the reference point O2.

Third Plate-Shaped Member

The third plate-shaped member 300 is a plate-shaped member such as a steel plate having substantially a cross shape and having four protrusions where the outer periphery thereof protrudes in the radial direction around the reference point O3 (not shown), and four recesses which are provided between the respective protrusions and where the outer periphery thereof is recessed in the radial direction.

The third plate-shaped member 300 has the same shape as the second plate-shaped member 200 in a plan view. The third plate-shaped member 300 is located upward of the second plate-shaped member 200 so as to be rotated by a predetermined angle (in the present embodiment, about 18 degrees) in the rotational direction X1 from the plane position of the second plate-shaped member 200.

In the protrusions of the third plate-shaped member 300, the third through holes 34A, 34B, 34C, 34D (not shown) through which the second support columns 21A, 21B, 21C, 21D of the second plate-shaped member 200 penetrate are provided. The second support plates 22A, 22B, 22C, 22D are attached to the upper parts of the second support columns 21A, 21B, 21C, 21D penetrating through the third through holes 34A, 34B, 34C, 34D, by, for example, screwing.

On the protrusions of the third plate-shaped member 300, third support columns 31A, 31B, 31C, 31D are attached at positions adjacent to the third through holes 34A, 34B, 34C, 34D in the rotational direction X1 around the reference point O3, by, for example, screwing.

The third support columns 31A, 31B, 31C, 31D are attached at positions that are on a circumference centered at the reference point O3 of the third plate-shaped member 300 and are four locations near the vertices of a quadrangle, preferably a square, centered at the reference point O3. The third support columns 31A, 31B, 31C, 31D each include three columns.

The third support columns 31A, 31B, 31C, 31D penetrate through fourth through holes 44A, 44B, 44C, 44D (not shown) of the fourth plate-shaped member 400, and third support plates 32A, 32B, 32C, 32D are attached to upper parts of the third support columns 31A, 31B, 31C, 31D, by, for example, screwing.

The third support plates 32A, 32B, 32C, 32D are each provided with a third wire 36. The third wire 36 is configured to suspend the fourth plate-shaped member 400.

Here, the third support columns 31A, 31B, 31C, 31D and the third support plates 32A, 32B, 32C, 32D are respectively referred to as third wire support portions 3A, 3B, 3C, 3D supporting the third wires 36.

The third wire support portions 3A, 3B, 3C, 3D and the third wires 36 are arranged at positions that are on a circumference centered at the reference point O3 of the third plate-shaped member 300 and are near the vertices of a quadrangle, preferably a square, centered at the reference point O3.

Fourth Plate-Shaped Member

The fourth plate-shaped member 400 is a plate-shaped member having a cross shape and having four protrusions where the outer periphery thereof protrudes in the radial direction around the reference point O4 (not shown), and four recesses which are provided between the respective protrusions and where the outer periphery thereof is recessed in the radial direction.

The fourth plate-shaped member 400 has the same shape as the second plate-shaped member 200 and the third plate-shaped member 300 in a plan view. The fourth plate-shaped member 400 is located upward of the third plate-shaped member 300 so as to be rotated by a predetermined angle (in the present embodiment, about 18 degrees) in the rotational direction X1 from the plane position of the third plate-shaped member 300.

In the protrusions of the fourth plate-shaped member 400, the fourth through holes 44A, 44B, 44C, 44D (not shown) through which the third support columns 31A, 31B, 31C, 31D of the third plate-shaped member 300 penetrate are provided. The third support plates 32A, 32B, 32C, 32D are attached to the upper parts of the third support columns 31A, 31B, 31C, 31D penetrating through the fourth through holes 44A, 44B, 44C, 44D, by, for example, screwing.

On the protrusions of the fourth plate-shaped member 400, fourth support columns 41A, 41B, 41C, 41D are attached at positions adjacent to the fourth through holes 44A, 44B, 44C, 44D in the rotational direction X1 around the reference point O4, by, for example, screwing.

The fourth support columns 41A, 41B, 41C, 41D are attached at positions that are on a circumference centered at the reference point O4 of the fourth plate-shaped member 400 and are four locations near the vertices of a quadrangle, preferably a square, around the reference point O4. The fourth support columns 41A, 41B, 41C, 41D each include three columns.

The fourth support columns 41A, 41B, 41C, 41D penetrate through fifth through holes 54A, 54B, 54C, 54D (not shown) of the fifth plate-shaped member 500, and fourth support plates 42A, 42B, 42C, 42D are attached to upper parts of the fourth support columns 41A, 41B, 41C, 41D, by, for example, screwing.

The fourth support plates 42A, 42B, 42C, 42D are each provided with a fourth wire 46. The fourth wire 46 is configured to suspend the fifth plate-shaped member 500.

Here, the fourth support columns 41A, 41B, 41C, 41D and the fourth support plates 42A, 42B, 42C, 42D are respectively referred to as fourth wire support portions 4A, 4B, 4C, 4D supporting the fourth wires 46.

The fourth wire support portions 4A, 4B, 4C, 4D and the fourth wires 46 are arranged at positions that are on a circumference centered at the reference point O4 of the fourth plate-shaped member 400 and are near the vertices of a quadrangle, preferably a square, centered at the reference point O4.

Fifth Plate-Shaped Member

The fifth plate-shaped member 500 is a plate-shaped member having a cross shape and having four protrusions 503A where the outer periphery thereof protrudes in the radial direction around the reference point O5, and four recesses 503B which are provided between the respective protrusions 503A and where the outer periphery thereof is recessed in the radial direction.

The fifth plate-shaped member 500 has the same shape as the second, third, and fourth plate-shaped members 200, 300, 400 in a plan view. The fifth plate-shaped member 500 is located upward of the fourth plate-shaped member 400 so as to be rotated by a predetermined angle (in the present embodiment, about 18 degrees) in the rotational direction X1 from the plane position of the fourth plate-shaped member 400.

In the protrusions 503A of the fifth plate-shaped member 500, the fifth through holes 54A, 54B, 54C, 54D through which the fourth support columns 41A, 41B, 41C, 41D of the fourth plate-shaped member 400 penetrate are provided. The fourth support plates 42A, 42B, 42C, 42D are attached to the upper parts of the fourth support columns 41A, 41B, 41C, 41D penetrating through the fifth through holes 54A, 54B, 54C, 54D, by, for example, screwing.

On the protrusions 503A of the fifth plate-shaped member 500, fifth support columns 51A, 51B, 51C, 51D are attached at positions adjacent to the fifth through holes 54A, 54B, 54C, 54D in the rotational direction X1 around the reference point O5, by, for example, screwing.

The fifth support columns 51A, 51B, 51C, 51D are attached at positions that are on a circumference centered at the reference point O5 of the fifth plate-shaped member 500 and are four locations near the vertices of a quadrangle, preferably a square, centered at the reference point O5. The fifth support columns 51A, 51B, 51C, 51D each include three columns.

Mounting Base

Although not shown in FIG. 10, the mounting base is located vertically upward of the fifth plate-shaped member 500.

The mounting base has the same shapes as the second, third, fourth, and fifth plate-shaped members 200, 300, 400, 500 in a plan view.

The mounting base is located upward of the fifth plate-shaped member 500 so as to be rotated by a predetermined angle (in the present embodiment, about 18 degrees) in the rotational direction X1 from the plane position of the fifth plate-shaped member 500.

The mounting base is attached to the fifth support columns 51A, 51B, 51C, 51D provided to the fifth plate-shaped member 500, by, for example, screwing.

The mounting base may not necessarily have the same shape as the other plate-shaped members, and may have a disk shape, for example. In a case where the mounting base has the same shape as the other plate-shaped members, an effect that members having the same shape can be used is provided.

Effects of Embodiment 2

As described above, according to the present embodiment, the first wire support portions on the first plate-shaped member and the first wires thereof are arranged at a plurality of locations on a circumference centered at the reference point on the first plate-shaped member, and the kth wire support portions on the kth plate-shaped member and the kth wires thereof (in embodiment 2, k=2, 3, 4) are arranged at a plurality of locations on a circumference centered at the reference point on the kth plate-shaped member.

Thus, the respective wire support portions and wires are arranged in a well-balanced manner, whereby vibration transmission between the vibration device and the external surface can be inhibited in a well-balanced manner.

In addition, the first wire support portions on the first plate-shaped member and the first wires thereof are arranged at vertices of an M-gon centered at the reference point on the first plate-shaped member, M being an integer not less than 3 (in embodiment 2, M=4), and the kth wire support portions on the kth plate-shaped member and the kth wires thereof (in embodiment 2, k=2, 3, 4) are arranged at vertices of the M-gon centered at the reference point on the kth plate-shaped member.

Thus, the respective wire support portions and wires are arranged in a well-balanced manner, whereby vibration transmission between the vibration device and the external surface can be inhibited in a well-balanced manner.

While M is 3 in embodiment 1 and M is 4 in embodiment 2, the present disclosure is also applicable to a case where M is an integer not less than 5.

In addition, the M-gon is a regular M-gon (in embodiment 2, a square).

Thus, the respective wire support portions and wires are arranged in a well-balanced manner, whereby vibration transmission between the vibration device and the external surface can be inhibited in a well-balanced manner.

In addition, the vertices of the regular M-gon where the kth wire support portions on the kth plate-shaped member and the kth wires thereof are arranged, and the vertices of the regular M-gon where the (k−1)th wire support portions on the (k−1)th plate-shaped member and the (k−1)th wires thereof are arranged, are shifted from each other in the predetermined rotational direction by an angle of 360/M·p degrees around the reference points on the kth plate-shaped member and the (k−1)th plate-shaped member, p being an integer not less than 2.

Thus, arrangement of the wire support portions and the wires provided to the respective plate-shaped members is well balanced, whereby vibration transmission between the vibration device and the external surface can be effectively inhibited.

For example, as shown in FIG. 10 in embodiment 2, the vertices of the square where the wire support portions on the plate-shaped member at an upper stage and the wires thereof are arranged, and the vertices of the square where the wire support portions on the plate-shaped member at a lower stage and the wires thereof are arranged, are shifted from each other in the predetermined rotational direction by $\theta 2=360/4.5=18$ degrees (M=4, p=5) around the reference points.

Thus, arrangement of the wire support portions and the wires provided to the respective plate-shaped members is well balanced, whereby vibration transmission between the vibration device and the external surface can be effectively inhibited.

In addition, the second, . . . , Nth plate-shaped members (in embodiment 2, N=5) each have M protrusions where an outer periphery thereof protrudes in a radial direction around the reference point on the plate-shaped member (in embodiment 2, M=4), and M recesses which are provided between the respective protrusions and where the outer periphery thereof is recessed in the radial direction.

Thus, the entire height of the insulator can be reduced.

The other effects are the same as those described in embodiment 1, and therefore the description thereof is omitted.

Embodiment 3

In the above embodiments, the insulator in which the wire support portion includes the support columns and the support plate which is provided at the upper parts of the support columns and to which the wire suspending the plate-shaped member is provided, has been described.

In the present embodiment, an insulator in which the wire support portion includes the support columns and a cantilever which is provided at the upper parts of the support columns and to which the wire suspending the plate-shaped member is provided, will be described.

Figure 11:
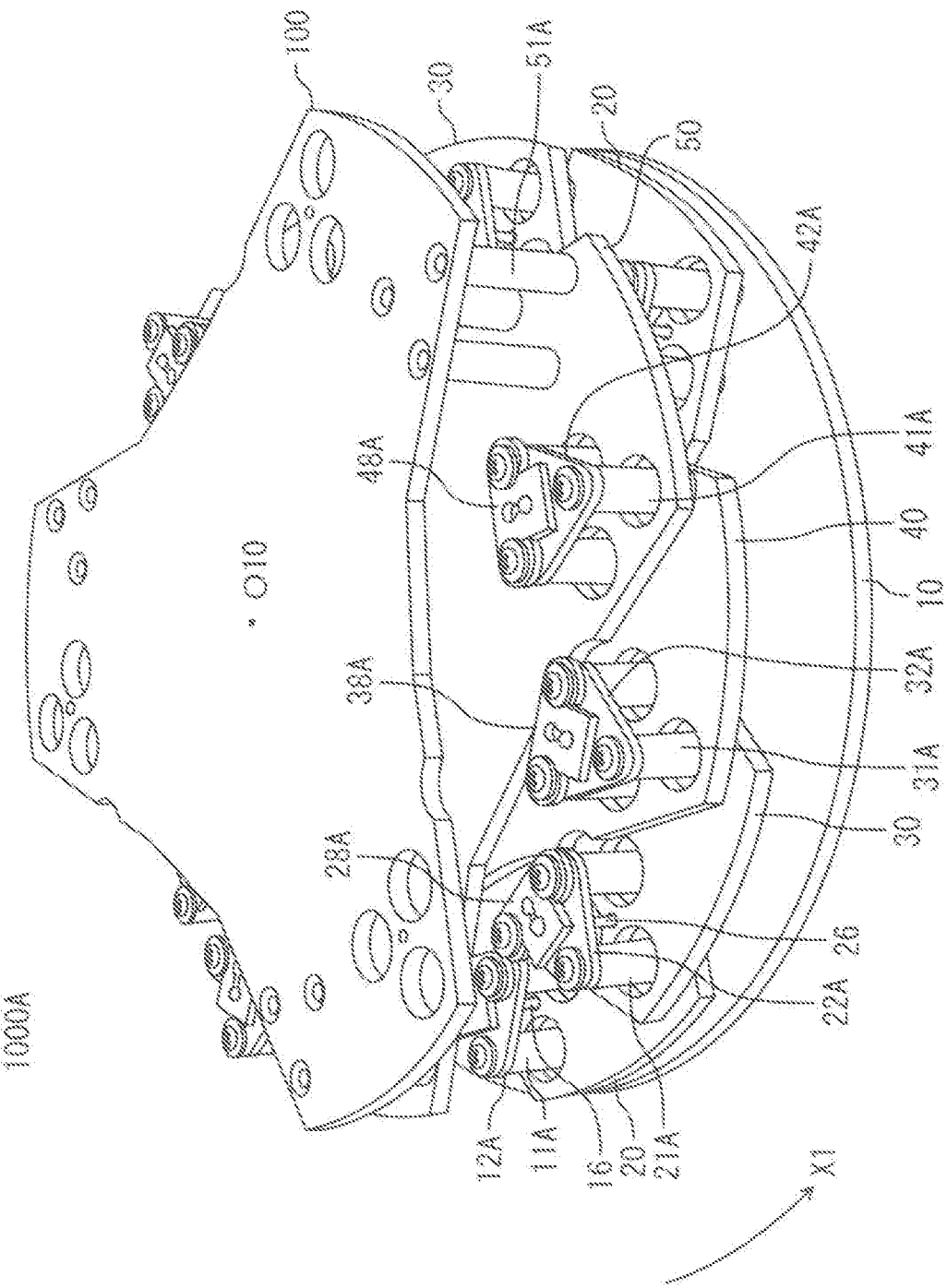
FIG. 11 is a perspective view showing the entire structure of an insulator according to embodiment 3.

FIG. 11 is a perspective view showing the entire structure of an insulator according to embodiment 3.

In FIG. 11, as in embodiment 1, an insulator 1000A of embodiment 3 includes the first plate-shaped member 10, the second plate-shaped member 20, the third plate-shaped member 30, the fourth plate-shaped member 40, and the fifth plate-shaped member 50 which are arranged in this order at multiple stages in the vertical direction. The first plate-shaped member 10 is placed on an external surface such as a floor, and the mounting base 100 serving as a base for mounting a vibration device (not shown) thereon is attached to the fifth plate-shaped member 50.

Hereinafter, the insulator of embodiment 3 will be described about difference from embodiment 1. The other matters are the same as in embodiment 1 and therefore the description thereof is omitted.

Figure 13:
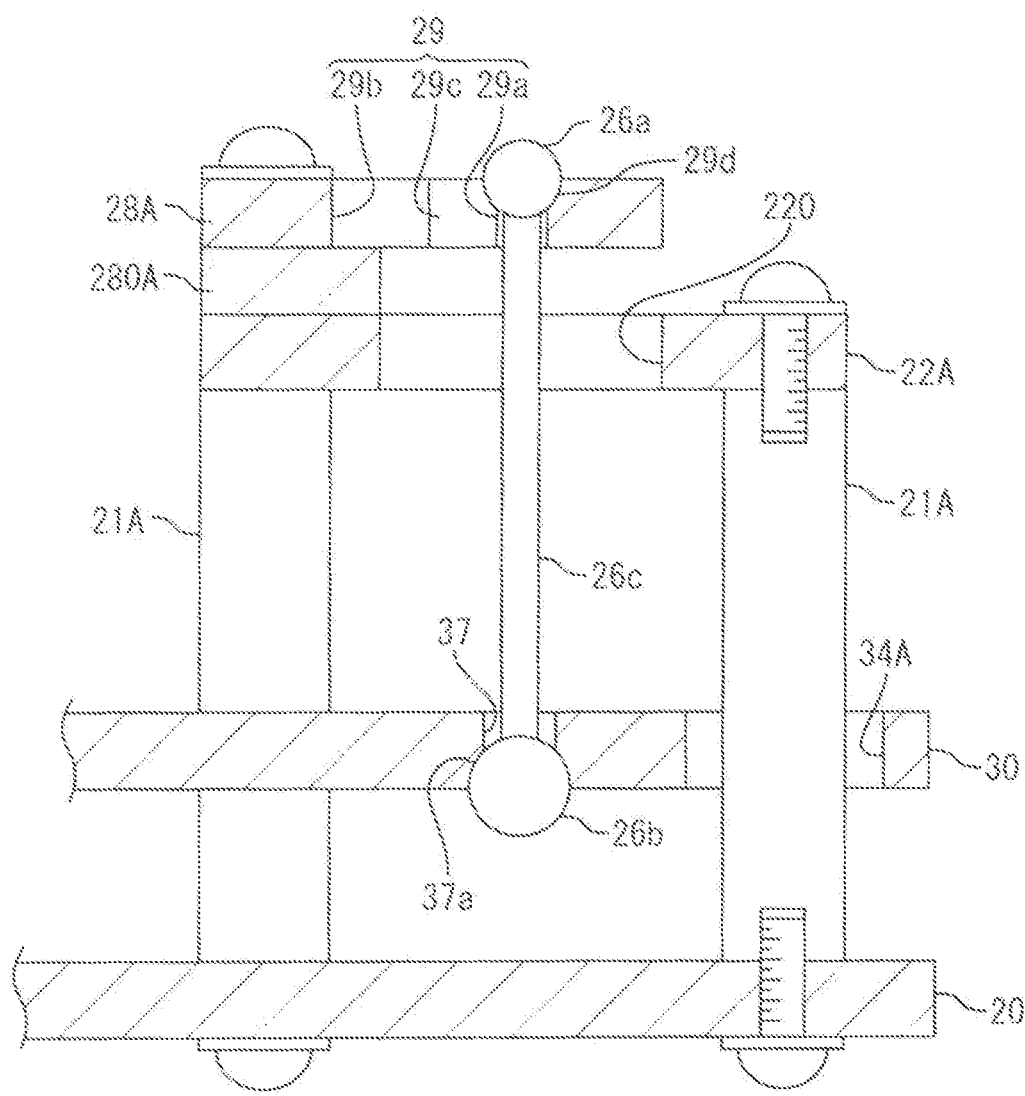
FIG. 13 shows a cross-section along line E1-E1 in FIG. 12A.
Figure 14:
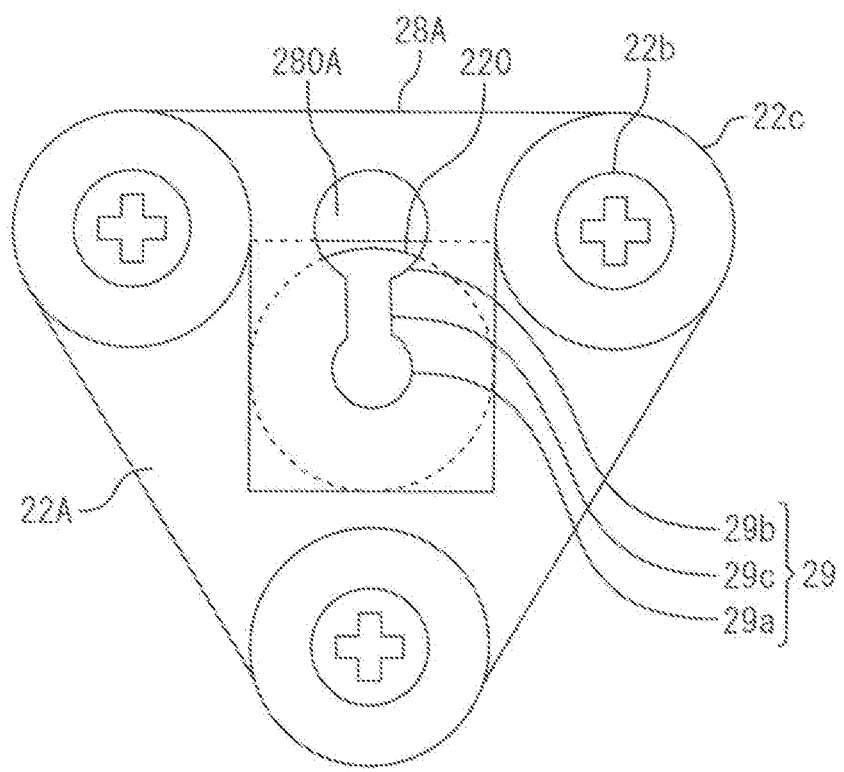
FIG. 14 is a plan view of the wire support portion of the insulator of embodiment 3, as seen from above.
Figure 15A:
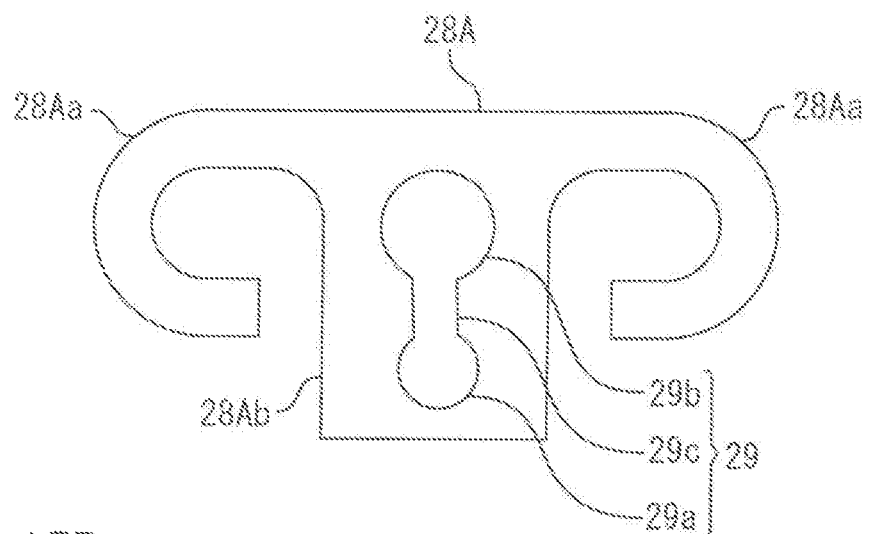
FIG. 15A is a plan view showing a cantilever of the wire support portion of the insulator of embodiment 3.

FIG. 12A, FIG. 12B, and FIG. 12C are perspective views of the wire support portion of the insulator of embodiment 3, as seen in three different directions. FIG. 13 shows a cross-section along line E1-E1 in FIG. 12A. FIG. 14 is a plan view of the wire support portion of the insulator of embodiment 3, as seen from above. FIG. 15A is a plan view showing the cantilever of the wire support portion of the insulator of embodiment 3, FIG. 15B is a plan view showing a spacer of the wire support portion of the insulator of embodiment 3, and FIG. 15C is a plan view showing a support plate of the wire support portion of the insulator of embodiment 3.

As shown in FIG. 13, the second support columns 21A provided to the second plate-shaped member 20 penetrate through the third through holes 34A of the third plate-shaped member 30. The second support plate 22A is attached to the upper parts of the second support columns 21A penetrating through the third through holes 34A, by, for example, screws and washers.

Figure 15B:
FIG. 15B is a plan view showing a spacer of the wire support portion of the insulator of embodiment 3.
Figure 15C:
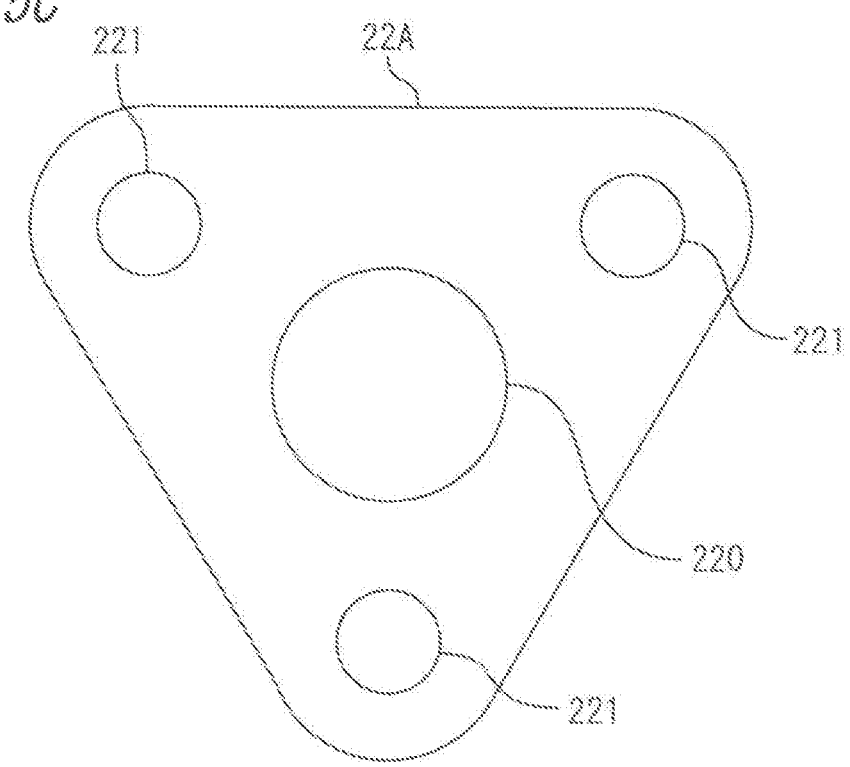
FIG. 15C is a plan view showing a support plate of the wire support portion of the insulator of embodiment 3.

As shown in FIG. 15C, the second support plate 22A has a triangle shape, preferably an equilateral triangle shape, in a plan view. Attachment holes 221 for attaching the second support column 21A are provided substantially near the vertices of the triangle shape of the second support plate 22A. In addition, a through hole 220 through which the second wire 26 penetrates is provided substantially near the center of the triangular shape of the second support plate 22A.

A second spacer 280A whose plan shape is shown in FIG. 15B is provided on the upper side of the second support plate 22A, and a second cantilever 28A is provided on the upper side of the second spacer 280A. The second spacer 280A and the second cantilever 28A are attached to the second support plate 22A by two second support columns 21A via screws and washers.

As shown in FIG. 15A, the second cantilever 28A has: a support portion 28Aa having a straight portion and curved portions provided at both ends of the straight portion, so as to be supported by the second support columns 21A via screws and washers; and a cantilever portion 28Ab extending in one direction from the support portion 28Aa.

An engagement hole 29 is provided near the center of the second cantilever 28A in a plan view. The engagement hole 29 has a first hole 29*a*, a second hole 29*b*, and a connection hole 29*c* connecting the first hole 29*a* and the second hole 29*b*. The first hole 29*a* has a smaller hole diameter than the second hole 29*b*.

The first hole 29*a* has such a size that does not allow the first spherical portion 26*a* provided at the upper part of the straight portion 26*c* of the second wire 26 to pass therethrough, and the second hole 29*b* has such a size that allows the first spherical portion 26*a* to pass therethrough. The connection hole 25*c* has such a size that does not allow the first spherical portion 26*a* to pass therethrough but allows the straight portion 26*c* of the second wire 26 to pass therethrough.

As shown in FIG. 13, the first spherical portion 26*a* at the upper part of the second wire 26 is engaged with a bowl-shaped seat surface 29*d* provided at an upper part of the first hole 29*a* of the second cantilever 28A.

The third plate-shaped member 30 is provided with the support hole 37 having such a size that allows the first spherical portion 26*a* of the second wire 26 to pass therethrough but does not allow the second spherical portion 26*b* to pass therethrough.

The second spherical portion 26*b* of the second wire 26 is engaged with the bowl-shaped seat surface 37*a* at the lower part of the support hole 37 of the third plate-shaped member 30, thus suspending the third plate-shaped member 30 by the straight portion 26*c* of the second wire 26.

That is, the second wire 26 has the first spherical portion 26*a* engaged with the seat surface 29*d* of the second cantilever 28A, and the second spherical portion 26*b* engaged with the seat surface 37*a* of the third plate-shaped member whereby the second wire 26 mainly serves as a pendulum for absorbing vibration in the horizontal direction and the second cantilever 28A mainly serves to absorb vibration in the vertical direction.

Here, the second support columns 21A, the second support plate 22A, the second spacer 280A, and the second cantilever 28A are collectively referred to as a second wire support portion 2AA supporting the second wire 26 (see FIG. 12A, FIG. 12B, FIG. 12C).

In the above description, the structures of the second support columns 21A, the second support plate 22A, the second spacer 280A, and the second cantilever 28A which form the second wire support portion 2AA, have been described as a representative example. However, the second support columns 21B, 21C, the second support plates 22B, 22C, the second spacers 280B, 280C and the second cantilevers 28B, 28C which form the second wire support portions 2AB, 2AC, also have the same structures. In addition, the first support columns 11A, 11B, 11C, the first support plates 12A, 12B, 12C, first spacers 180A, 180B, 180C, and first cantilevers 18A, 18B, 18C which form first wire support portions 1AA, 1AB, 1AC, also have the same structures. In addition, the third support columns 31A, 31B, 31C, the third support plates 32A, 32B, 32C, third spacers 380A, 380B, 380C, and third cantilevers 38A, 38B, 38C which form third wire support portions 3AA, 3AB, 3AC, also have the same structures. Further, the fourth support columns 41A, 41B, 41C, the fourth support plates 42A, 42B, 42C, fourth spacers 480A, 480B, 480C, and fourth cantilevers 48A, 48B, 48C which form fourth wire support portions 4AA, 4AB, 4AC also have the same structures.

FIG. 16 is a side view of the insulator according to embodiment 3.

As described in embodiment 1, since each plate-shaped member is provided with the recess where the outer periphery thereof is recessed, even if the wire support portion of the plate-shaped member located on the lower side of the above plate-shaped member has a height to a certain extent, the wire support portion does not interfere with the above plate-shaped member. Therefore, the entire height of the insulator does not become great and thus the insulator can be designed to be compact.

In FIG. 16, the thicknesses of the first to fifth plate-shaped members 10, 20, 30, 40, 50 and the mounting base 100 are denoted by p, the intervals between the first to fifth plate-shaped members are denoted by r, and the interval between the fifth plate-shaped member 50 and the mounting base 100 is denoted by g.

In the present embodiment, these values can be set as p=4 mm, r=3 mm to 6 mm, and g=20 mm, and a height t of the insulator can be set as t=56 mm to 68 mm.

Figure 17:
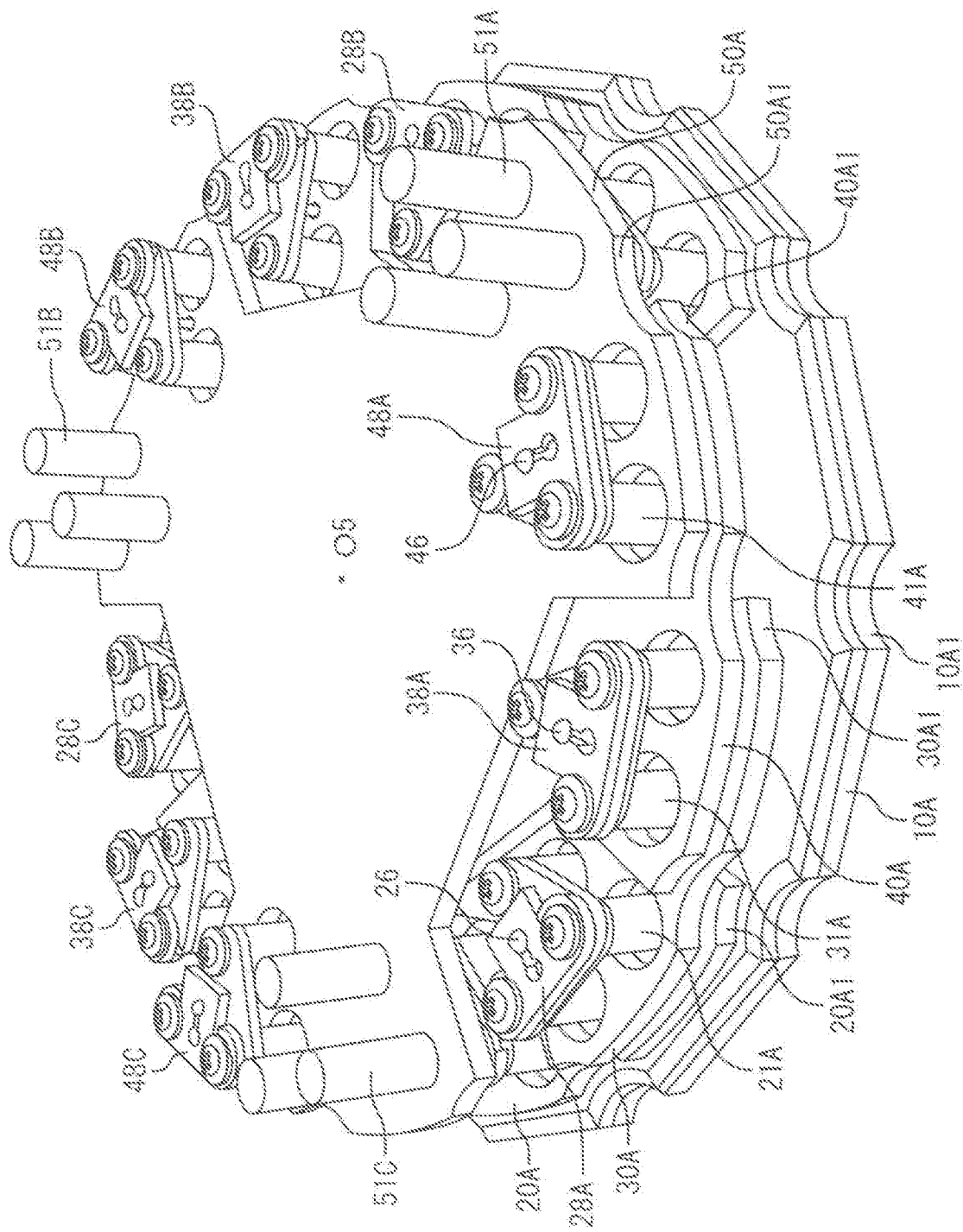
FIG. 17 is a perspective view showing a modification of the insulator according to embodiment 3.

FIG. 17 is a perspective view showing a modification of the insulator according to embodiment 3.

As shown in FIG. 17, free ends of the cantilevers 18A, 28A, 38A, 48A, 18B, 28B, 38B, 48B, 18C, 28C, 38C, 48C are designed to be directed toward the reference points O1, O2, O3, O4 of the respective plate-shaped members. In this case, as compared to the insulator in which free ends of the cantilevers 18A, 28A, 38A, 48A, 18B, 28B, 38B, 48B, 18C, 28C, 38C, 48C are directed outward as shown in FIG. 11, the diameter of the insulator in a plan view is shortened and thus the insulator can be designed to be compact.

In FIG. 17, the outer shapes of first to fifth plate-shaped members 10A to 50A are changed from the outer shapes of the plate-shaped members in FIG. 1. That is, grooves 10A1 are provided on the outer periphery of the first plate-shaped member 10A, grooves 20A1 are provided on the outer periphery of the second plate-shaped member 20A, grooves 30A1 are provided on the outer periphery of the third plate-shaped member 30A, grooves 40A1 are provided on the outer periphery of the fourth plate-shaped member 40A, and grooves 50A1 are provided on the outer periphery of the fifth plate-shaped member 50A, whereby an effect in terms of design is obtained and weight reduction is achieved.

Although not shown, the free ends of the cantilevers 18A, 28A, 38A, 48A, 18B, 28B, 38B, 48B, 18C, 28C, 38C, 48C may be directed along the predetermined rotational direction around the reference points O1, O2, O3, O4 of the respective plate-shaped members. Thus, vibration transmission between the vibration device and the external surface can be effectively inhibited.

As described above, according to the present embodiment, the (k−1)th wire support portions (in embodiment 3, k=2, 3, 4) each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and the (N−1)th wire support portions (in embodiment 3, N=5) each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

Thus, each wire serves as a pendulum for absorbing vibration in the horizontal direction, and each cantilever serves to absorb vibration in the vertical direction, whereby vibration transmission between the vibration device and the external surface can be effectively inhibited.

Embodiment 4

In the above embodiments, the mounting base 100 is a plate-shaped member having three protrusions where the outer periphery thereof protrudes in the radial direction around the reference point O10, and three recesses which are provided between the respective protrusions and where the outer periphery thereof is recessed in the radial direction, thus having the same shape as the second, third, fourth, and fifth plate-shaped members 20, 30, 40, 50 in a plan view. However, the shape of the mounting base is not limited thereto.

Figure 18:
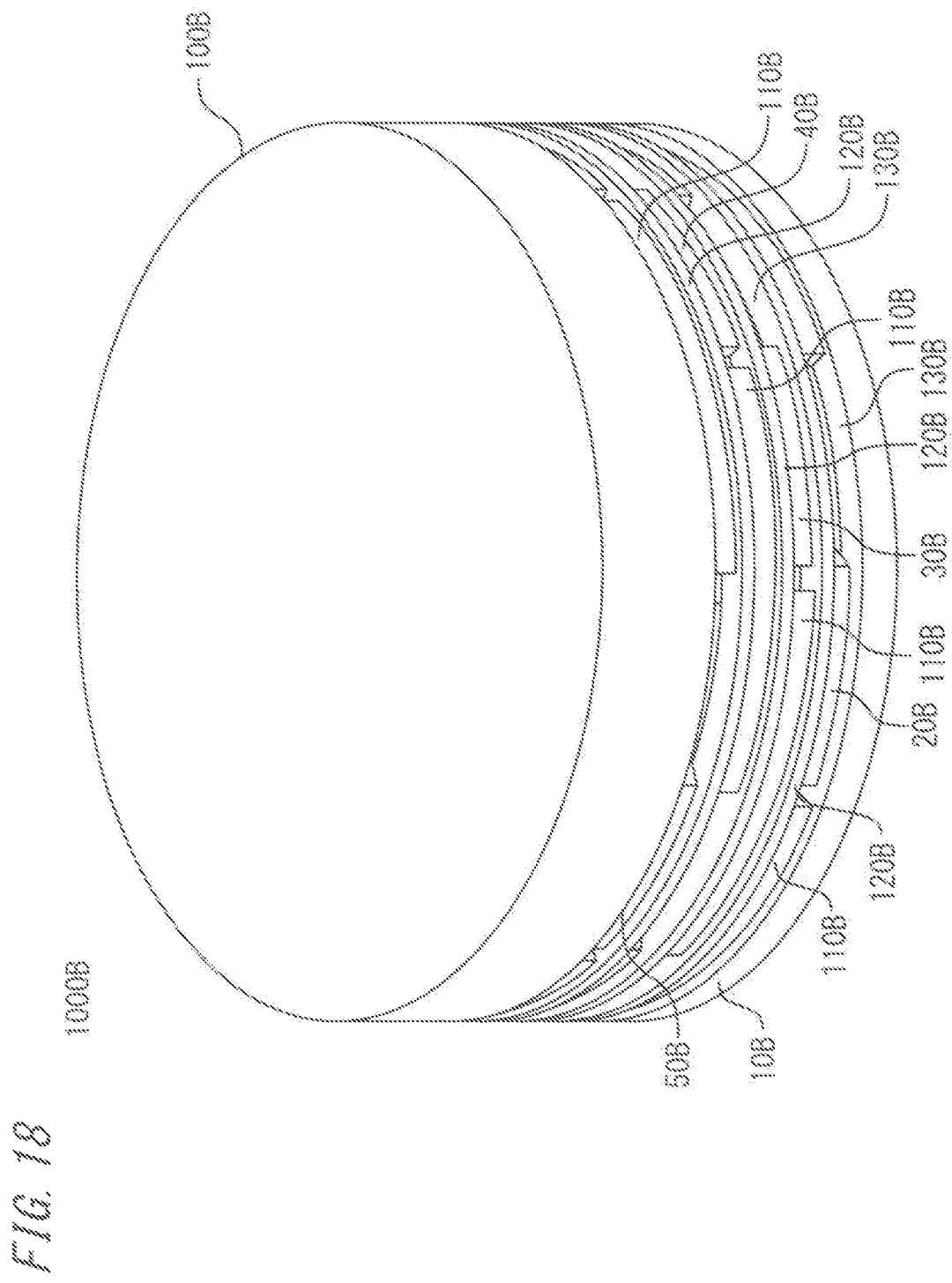
FIG. 18 is a perspective view showing the outer shape of an insulator according to embodiment 4.
Figure 19:
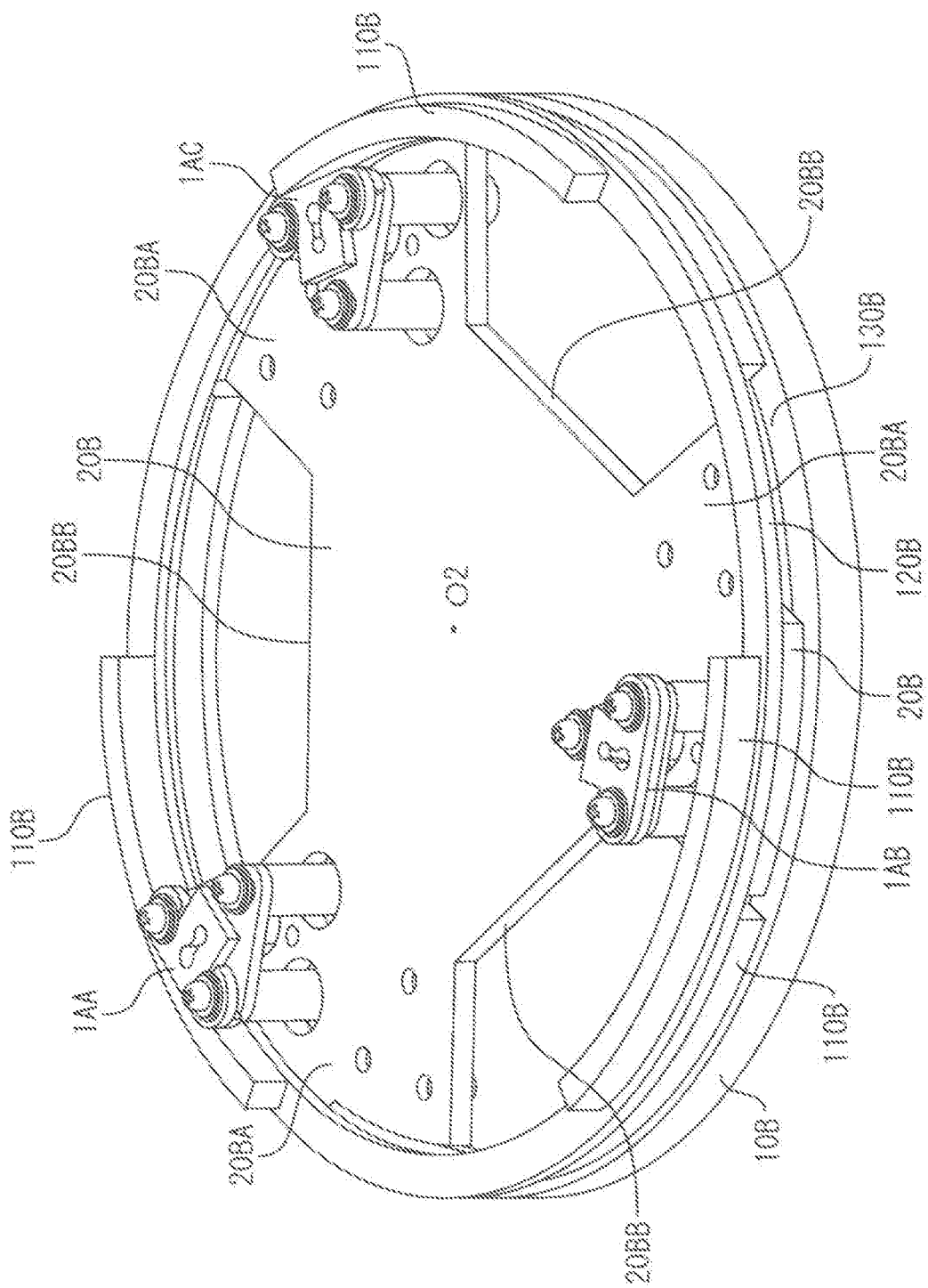
FIG. 19 is a perspective view showing an assembly process for the insulator according to embodiment 4.
Figure 20:
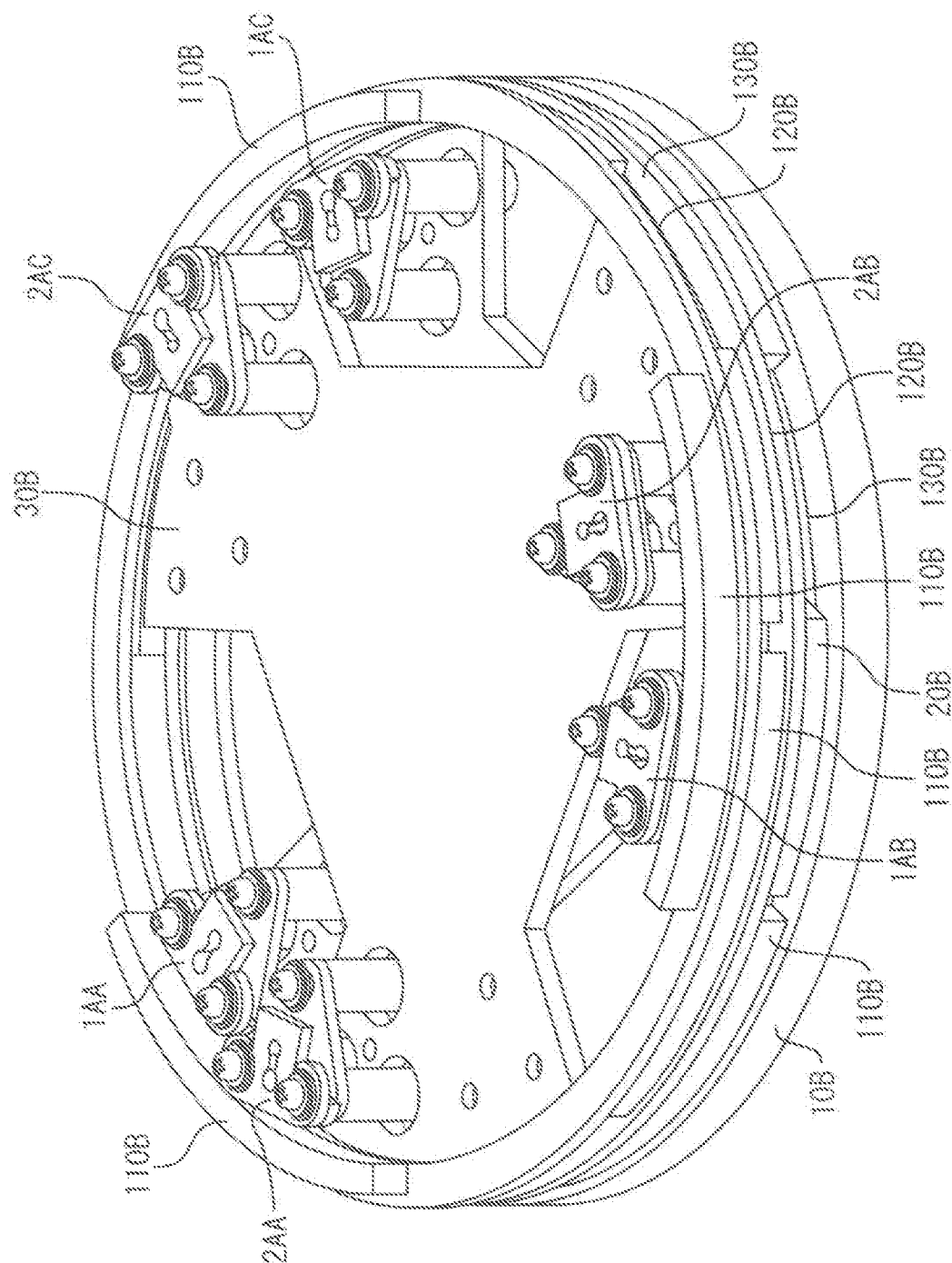
FIG. 20 is a perspective view showing an assembly process for the insulator according to embodiment 4.
Figure 21:
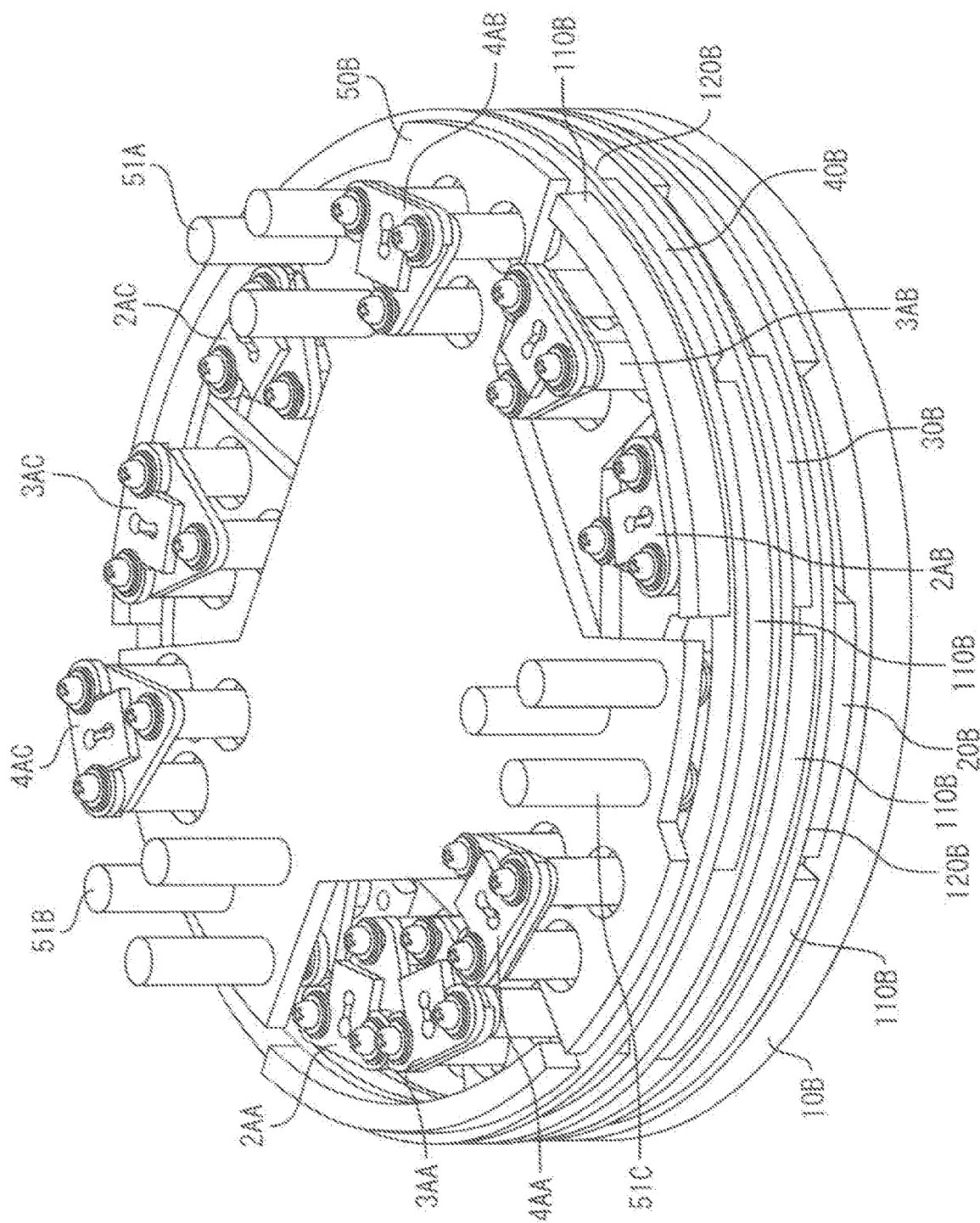
FIG. 21 is a perspective view showing an assembly process for the insulator according to embodiment 4.

FIG. 18 is a perspective view showing the outer diameter of an insulator according to embodiment 4. FIG. 19 to FIG. 21 are perspective views showing assembly processes for the insulator according to embodiment 4.

Hereinafter, the insulator of embodiment 4 will be described about difference from embodiment 3. The other matters and explanations are the same as in embodiment 3 and therefore the description thereof is omitted.

As shown in FIG. 18 to FIG. 21, an insulator 1000B of embodiment 4 includes a first plate-shaped member 10B, a second plate-shaped member 20B, a third plate-shaped member 30B, a fourth plate-shaped member 40B, and a fifth plate-shaped member 50B which are arranged in this order at multiple stages in the vertical direction. The first plate-shaped member 10B is placed on an external surface such as a floor, and a mounting base 100B serving as a base for mounting a vibration device (not shown) thereon is attached to the fifth plate-shaped member 50B via the fifth support columns 51A, 51B, 51C.

In FIG. 19, the first plate-shaped member 10B is a plate-shaped member having substantially a circular shape in a plan view, and is placed on the external surface such as a floor. The first plate-shaped member 10B is provided with the first wire support portions 1AA, 1AB, 1AC.

The second plate-shaped member 20B is suspended by the first wires 16 (not shown) attached to the first wire support portions 1AA, 1AB, 1AC.

The second plate-shaped member 20B is a plate-shaped member having three protrusions 20BA where the outer periphery thereof protrudes in the radial direction around the reference point O2, and three recesses 20BB which are provided between the respective protrusions 20BA and where the outer periphery thereof is recessed in the radial direction.

The third, fourth, and fifth plate-shaped members 40B, 50B have the same shape as the second plate-shaped member 20B in a plan view.

In FIG. 20, the second plate-shaped member 20B is provided with the second wire support portions 2AA, 2AB, 2AC, and the third plate-shaped member 30B is suspended by the second wires 26 (not shown) attached to the second wire support portions 2AA, 2AB, 2AC.

In FIG. 21, the third plate-shaped member 30B is provided with the third wire support portions 3AA, 3AB, 3AC, and the fourth plate-shaped member 40B is suspended by the third wires 36 (not shown) attached to the third wire support portions 3AA, 3AB, 3AC.

The fourth plate-shaped member 40B is provided with the fourth wire support portions 4AA, 4AB, 4AC, and the fifth plate-shaped member 50B is suspended by the fourth wires 46 (not shown) attached to the fourth wire support portions 4AA, 4AB, 4AC.

The mounting base 100B is attached to the fifth support columns 51A, 51B, 51C provided to the fifth plate-shaped member 50B.

The mounting base 100B has a cover shape covering a part of the side surface of the insulator 1000B, to protect the internal structure of the insulator 1000B.

At the outer periphery of the first plate-shaped member 10B, a plurality of first side walls 110B having partially an arc shape and second side walls 120B having a ring shape are sequentially stacked and fixed, and the internal structure of the insulator 1000B is protected by the first side walls 110B and the second side walls 120B.

Through windows 130B formed between the side surface of the mounting base 100B, the first side walls 110B, and the second side walls 120B, a part of the protrusions where the outer peripheries of the second plate-shaped member 20B, the third plate-shaped member 30B, the fourth plate-shaped member 40B, and the fifth plate-shaped member 50B protrude in the radial direction can be seen.

Further, the protrusions where the outer peripheries of the second, third, fourth, and fifth plate-shaped members 20B, 30B, 40B, 50B protrude in the radial direction are provided with steps so as to have different outer diameters, thus appealing to an aesthetic sense.

Next, regarding the insulator 1000B of embodiment 4, product examples thereof, and the materials, the sizes, and the like of parts composing the product examples will be described.

One product example is an insulator on which a vibration device (a speaker, a CD player, an LD player, a record player, a power amplifier, etc.) having a weight of about 250 kg can be mounted.

The first plate-shaped member 10B is made of an aluminum alloy, and is 174 mm in diameter and 7.5 mm in thickness.

The mounting base 100B is made of an aluminum alloy and is 174 mm in diameter, and the height of the outer peripheral side wall portion is 22.5 mm.

The second plate-shaped member 20B, the third plate-shaped member 30B, the fourth plate-shaped member 40B, and the fifth plate-shaped member 50B are made of stainless steel, and are 4 mm in thickness.

The first side wall 110B and the second side wall 120B are made of an aluminum alloy.

The first to fourth support columns forming the first to fourth wire support portions are made of stainless steel, and are 6 mm in diameter and 21 mm in height.

The first to fourth support plates forming the first to fourth wire support portions are made of stainless steel, and are 2 mm in thickness.

The spacers are made of stainless steel and are 2 mm in thickness.

The first to fourth cantilevers are made of stainless steel and are 2 mm in thickness.

The first to fourth wires are made of stainless steel, and are 1.5 mm in thickness and 17 mm in length. The static-load bearing capacity of one wire is about 90 kg.

The entire height of the insulator is 66 mm.

Although a product example of the insulator 1000B, and the materials, the sizes, and the like of components used for the product example have been described above, the materials may be another metal material, a stiff plastic material, or the like, and the sizes may be set as appropriate in accordance with the size and the weight of the vibration device.

In the insulator of the present embodiment, the mounting base has a cover shape covering a part of the side surface of the insulator, whereby the internal structure of the insulator can be protected and carrying and handling of the insulator can be facilitated.

In addition, the insulator can be formed to be compact as a whole, and the whole design of the insulator appeals to a person's aesthetic sense.

Other Embodiments

Figure 22:
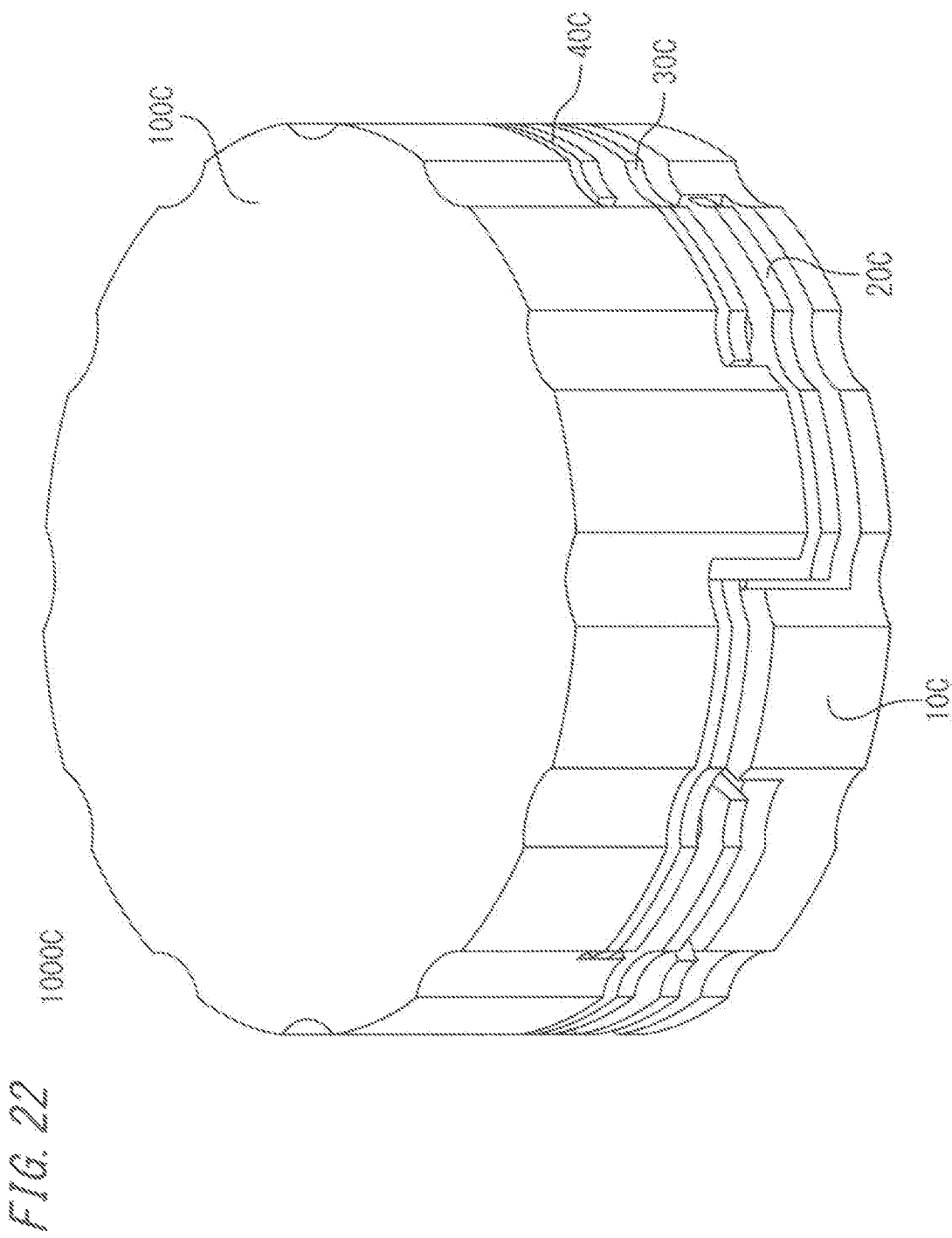
FIG. 22 is a perspective view showing the outer shape of an insulator according to another example of embodiment 4.
Figure 23:
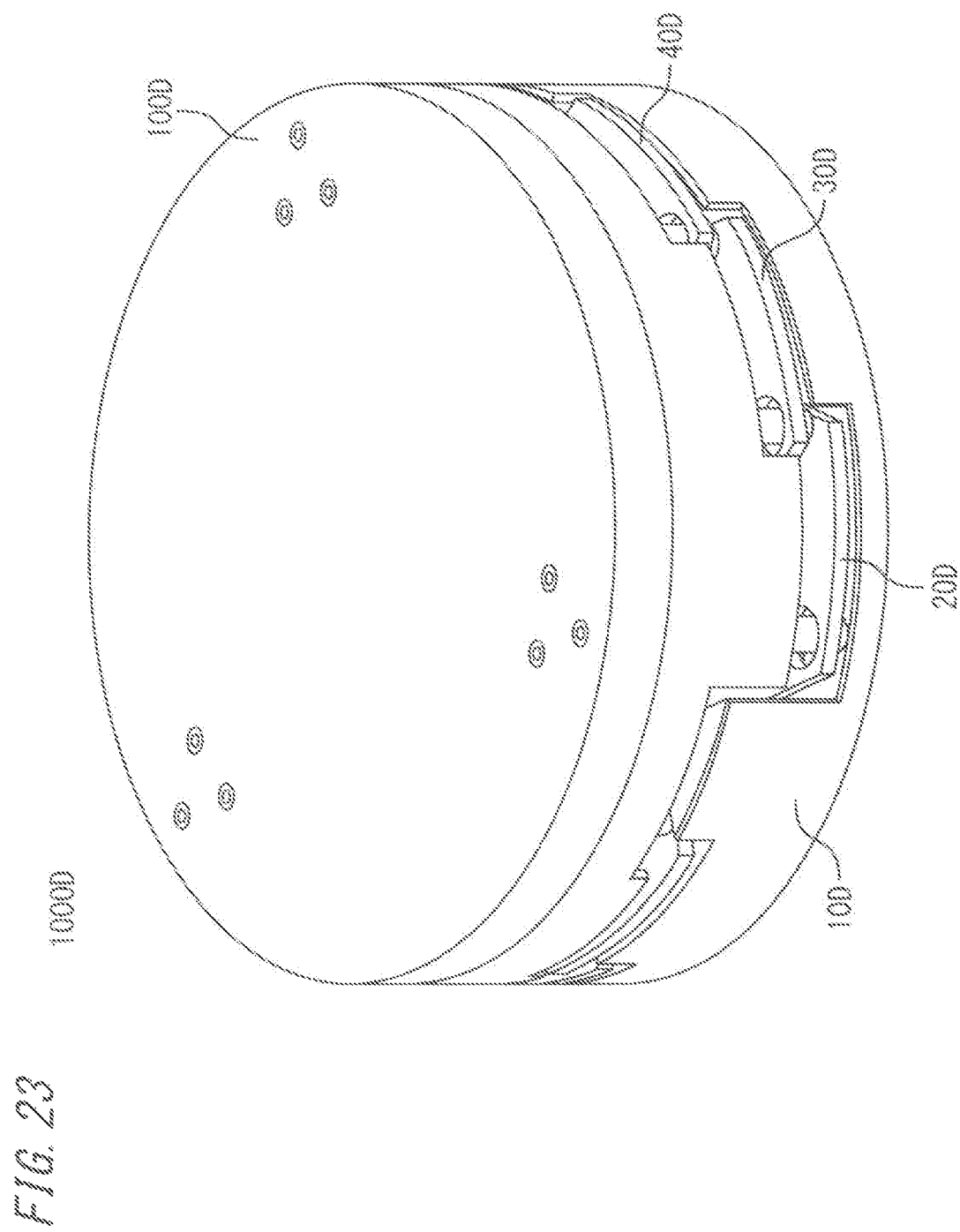
FIG. 23 is a perspective view showing the outer shape of an insulator according to another example of embodiment 4.

As shown in FIG. 22 or FIG. 23, a mounting base 100C, 100D having a shape covering a part of the side surface of an insulator 1000C or 1000D may be used. In FIG. 22 and FIG. 23, the first plate-shaped members 10C, 10D also have shapes covering a part of the side surface of the insulator, and parts of second plate-shaped members 20C, 20D, third plate-shaped members 30C, 30D, and fourth plate-shaped members 40C, 40D are seen from outside.

Figure 24A:
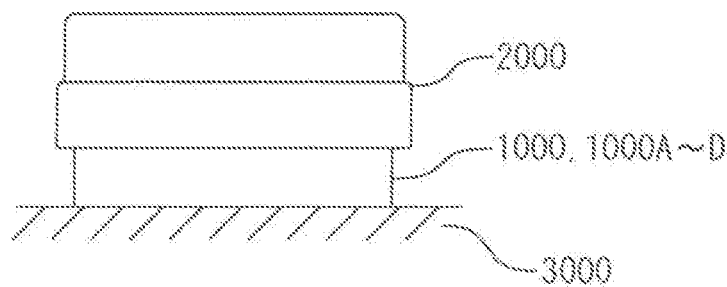
FIG. 24A, FIG. 24B, and FIG. 24C show an application example of the insulator of the present disclosure.

FIG. 24A is a side view showing an example in which the insulator of the present disclosure is applied to an LD player. In FIG. 24A, the insulator 1000, 1000A to 1000D of the present disclosure is interposed between an LD player 2000 and a floor or a rack 3000, and thus vibration of the LD player 2000 is prevented from being transmitted to the floor or the rack 3000. In addition, vibration from the floor or the rack 3000 is prevented from being transmitted to the LD player 2000.

Figure 24B:
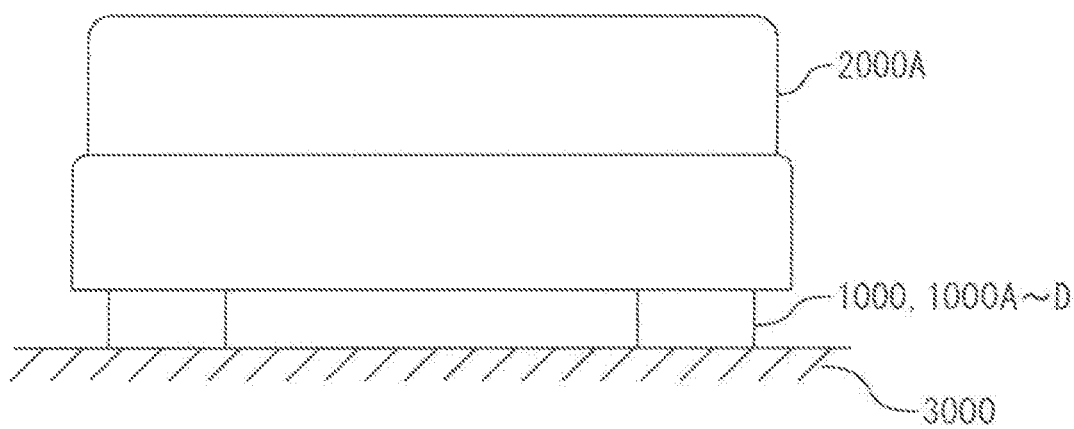
Figure 24C:
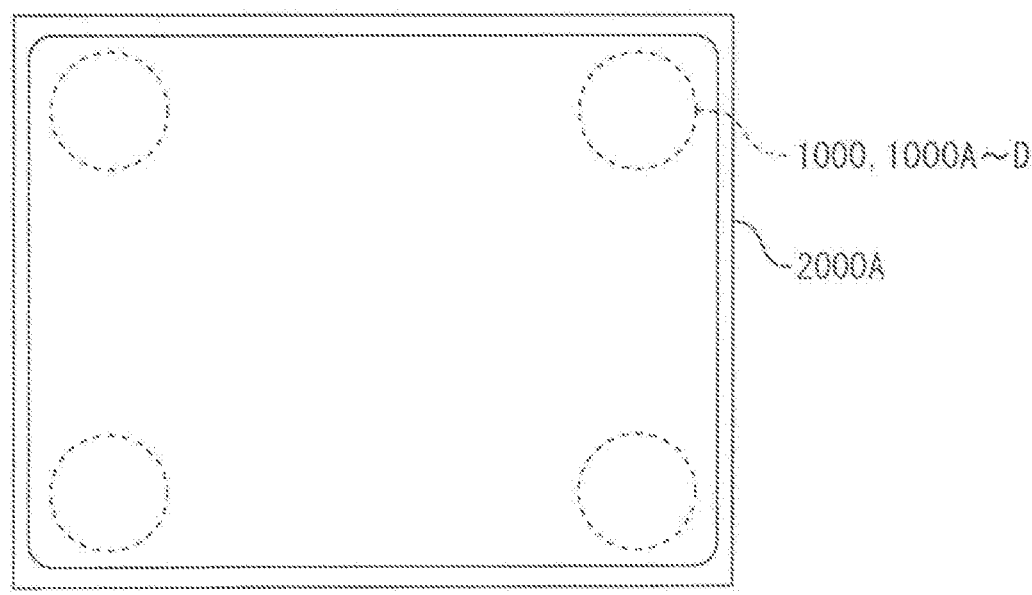

FIG. 24B and FIG. 24C are a side view and a plan view showing another example in which the insulator of the present disclosure is applied to the LD player. In FIG. 24B and FIG. 24B, four insulators 1000, 1000A to 1000D of the present disclosure are interposed between one large-sized LD player 2000A and a floor or a rack 3000, and thus vibration of the LD player 2000A is prevented from being transmitted to the floor or the rack 3000. In addition, vibration from the floor or the rack 3000 is prevented from being transmitted to the LD player 2000A.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10, 10A, 10B first plate-shaped member
1A, 1B, 1C, 1AA, 1AB, 1AC first wire support portion
11A, 11B, 11C, 11D first support column
12A, 12B, 12C, 12D first support plate
16 first wire
18A, 18B, 18C first cantilever
20A, 200 second plate-shaped member
2A, 2B, 2C, 2AA, 2AB, 2AC second wire support portion
21A, 21B, 21C, 21D second support column
22A, 22B, 22C, 22D second support plate
26 second wire
28A, 28B, 28C second cantilever
30A, 300 third plate-shaped member
3A, 3B, 3C, 3AA, 3AB, 3AC third wire support portion
31A, 31B, 31C, 31D third support column
32A, 32B, 32C, 32D third support plate
36 third wire
38A, 38B, 38C third cantilever
40, 40A, 400 fourth plate-shaped member
4A, 4B, 4C, 4AA, 4AB, 4AC fourth wire support portion
41A, 41B, 41C, 41D fourth support column
42A, 42B, 42C, 42D fourth support plate
46 fourth wire
48A, 48B, 48C fourth cantilever
50, 50A, 500 fifth plate-shaped member
51A, 51B, 51C, 51D fifth support column
100, 100B, 100C, 100D mounting base
1000, 1000B, 1000C, 1000D insulator

The invention claimed is:

1. An insulator which is disposed between a vibration device and an external surface and inhibits vibration transmission between the vibration device and the external surface, the insulator comprising:
N plate-shaped members which are first to Nth plate-shaped members and are arranged in this order at multiple stages such that reference points on the respective plate-shaped members are aligned in a vertical direction, N being an integer not less than 3, wherein
the plate-shaped member for a kth number counted from the first plate-shaped member is defined as a kth plate-shaped member, k being all integers not less than 2 and not greater than N−1,
the first plate-shaped member is provided with a first wire support portion,
the kth plate-shaped member is provided with a kth through hole through which a (k−1)th wire support portion provided to a (k−1)th plate-shaped member penetrates, a (k−1)th wire suspending the kth plate-shaped member is provided at an upper part of the (k−1)th wire support portion penetrating through the kth through hole, and a kth wire support portion is provided at a position adjacent to the kth through hole in a predetermined rotational direction around the reference point on the kth plate-shaped member,
the Nth plate-shaped member is provided with an Nth through hole through which an (N−1)th wire support portion provided to the (N−1)th plate-shaped member penetrates, an (N−1)th wire suspending the Nth plate-shaped member is provided at an upper part of the (N−1)th wire support portion penetrating through the Nth through hole, and a mounting base for mounting the vibration device thereon is attached to the Nth plate-shaped member,
the first wire support portions on the first plate-shaped member and the first wires thereof are arranged at a plurality of locations around the reference point on the first plate-shaped member, and
the kth wire support portions on the kth plate-shaped member and the kth wires thereof are arranged at a plurality of locations around the reference point on the kth plate-shaped member.

2. The insulator according to claim 1, wherein
the first wire support portions on the first plate-shaped member and the first wires thereof are arranged at a plurality of locations on a circumference centered at the reference point on the first plate-shaped member, and
the kth wire support portions on the kth plate-shaped member and the kth wires thereof are arranged at a plurality of locations on a circumference centered at the reference point on the kth plate-shaped member.

3. The insulator according to claim 1, wherein
the first wire support portions on the first plate-shaped member and the first wires thereof are arranged at vertices of an M-gon centered at the reference point on the first plate-shaped member, M being an integer not less than 3, and
the kth wire support portions on the kth plate-shaped member and the kth wires thereof are arranged at vertices of the M-gon centered at the reference point on the kth plate-shaped member.

4. The insulator according to claim 3, wherein
the M-gon is a regular M-gon.

5. The insulator according to claim 4, wherein
the vertices of the regular M-gon where the kth wire support portions on the kth plate-shaped member and the kth wires thereof are arranged, and the vertices of the regular M-gon where the (k−1)th wire support portions on the (k−1)th plate-shaped member and the (k−1)th wires thereof are arranged, are shifted from each other in the predetermined rotational direction by an angle of 360/M·p degrees around the reference points on the kth plate-shaped member and the (k−1)th plate-shaped member, p being an integer not less than 2.

6. The insulator according to claim 3, wherein
the kth plate-shaped member and the Nth plate-shaped member each have M protrusions where an outer periphery thereof protrudes in a radial direction around the reference point on the plate-shaped member, and M recesses which are provided between the respective protrusions and where the outer periphery thereof is recessed in the radial direction.

7. The insulator according to claim 1, wherein
the (k−1)th wire support portions each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and
the (N−1)th wire support portions each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

8. The insulator according to claim 1, wherein
the (k−1)th wire support portions each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and
the (N−1)th wire support portions each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

9. The insulator according to claim 1, wherein
the second to Nth plate-shaped members are plate-shaped members having the same shape, the first to (N−1)th wire support portions are wire support portions having the same structure, and the first to (N−1)th wires are wires having the same shape.

10. The insulator according to claim 2, wherein
the first wire support portions on the first plate-shaped member and the first wires thereof are arranged at vertices of an M-gon centered at the reference point on the first plate-shaped member, M being an integer not less than 3, and
the kth wire support portions on the kth plate-shaped member and the kth wires thereof are arranged at vertices of the M-gon centered at the reference point on the kth plate-shaped member.

11. The insulator according to claim 10, wherein
the M-gon is a regular M-gon.

12. The insulator according to claim 11, wherein
the vertices of the regular M-gon where the kth wire support portions on the kth plate-shaped member and the kth wires thereof are arranged, and the vertices of the regular M-gon where the (k−1)th wire support portions on the (k−1)th plate-shaped member and the (k−1)th wires thereof are arranged, are shifted from each other in the predetermined rotational direction by an angle of 360/M·p degrees around the reference points on the kth plate-shaped member and the (k−1)th plate-shaped member, p being an integer not less than 2.

13. The insulator according to claim 2, wherein
the (k−1)th wire support portions each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and
the (N−1)th wire support portions each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

14. The insulator according to claim 3, wherein
the (k−1)th wire support portions each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and
the (N−1)th wire support portions each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

15. The insulator according to claim 4, wherein
the (k−1)th wire support portions each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

16. The insulator according to claim 5, wherein the (k−1)th wire support portions each include a (k−1)th support column penetrating through the kth through hole of the kth plate-shaped member, and a (k−1)th support plate which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th support plate which is provided at an upper part of the (N−1)th support column and to which the (N−1)th wire suspending the Nth plate-shaped member is provided.

17. The insulator according to claim 2, wherein the (k−1)th wire support portions each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

18. The insulator according to claim 3, wherein the (k−1)th wire support portions each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

19. The insulator according to claim 4, wherein the (k−1)th wire support portions each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

20. The insulator according to claim 5, wherein the (k−1)th wire support portions each include a (k−1)th support column penetrating through the kth through hole of the kth plate-shaped member, and a (k−1)th cantilever which is provided at an upper part of the (k−1)th support column and to which the (k−1)th wire suspending the kth plate-shaped member is provided, and the (N−1)th wire support portions each include an (N−1)th support column penetrating through the Nth through hole of the Nth plate-shaped member, and an (N−1)th cantilever which is provided at an upper part of the (N−1)th support column and to which the (N−1)th wire suspending the Nth plate-shaped member is provided.

\* \* \* \* \*